United States Patent
Maeda et al.

(10) Patent No.: US 9,648,540 B2
(45) Date of Patent: May 9, 2017

(54) NODE DEVICE AND DATA RELAYING METHOD

(71) Applicant: FUJITSU LIMITED, Kawasaki-shi, Kanagawa (JP)

(72) Inventors: Kenji Maeda, Kasuga (JP); Satoshi Esaka, Fukuoka (JP); Yoshiyuki Jufuku, Itoshima (JP); Tatsuya Soneda, Fukuoka (JP); Kiyoshi Nakagawa, Fukuoka (JP); Taiji Kondo, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 14/535,468

(22) Filed: Nov. 7, 2014

(65) Prior Publication Data
US 2015/0139237 A1    May 21, 2015

(30) Foreign Application Priority Data
Nov. 18, 2013 (JP) ................. 2013-238132

(51) Int. Cl.
*H04L 12/28* (2006.01)
*H04W 40/00* (2009.01)
*H04L 12/703* (2013.01)

(52) U.S. Cl.
CPC ............. *H04W 40/00* (2013.01); *H04L 45/28* (2013.01)

(58) Field of Classification Search
CPC ..................................... H04L 45/745
USPC ...................................... 370/392
See application file for complete search history.

(56) References Cited

FOREIGN PATENT DOCUMENTS

JP    2004-297237    10/2004
JP    2006-191218    7/2006

*Primary Examiner* — Man Phan
*Assistant Examiner* — Pamit Kaur
(74) *Attorney, Agent, or Firm* — Staas & Halsey LLP

(57) ABSTRACT

A node device includes: a communication unit to transmit a data frame containing frequency information and receive the data frame; a storage unit to store a table in which frame identification information and the frequency information are associated; and a control unit to: determine whether a destination of the received data frame is its own node device; determine whether the frame identification information of the received data frame is registered in the table; determine whether the number of transmission times is less than or equal to the number of transmission times corresponding to the frame identification information registered in the table; update the frequency information corresponding to the frame identification information registered in the table with the frequency information of the received data frame; and increase the number of transmission times, wherein the communication unit transmits the data frame for which the number of transmission times is increased.

12 Claims, 17 Drawing Sheets

FIG.3

| LD | LS | GD | GS | FID | FRAME TYPE | HTL COUNTER |

FIG.4

| FIELD NAME | STORED INFORMATION |
|---|---|
| LD | NODE ID OF ADJACENT NODE DEVICE WHICH BECOMES TRANSMISSION DESTINATION |
| LS | NODE ID OF ADJACENT NODE DEVICE OF TRANSMISSION SOURCE |
| GD | NODE ID OF FINAL DESTINATION NODE DEVICE |
| GS | NODE ID OF ISSUANCE SOURCE NODE DEVICE OF FRAME |
| FID | FRAME ID IN ISSUANCE SOURCE NODE DEVICE OF FRAME |
| FRAME TYPE | INFORMATION WHICH INDICATES FRAME TYPE |
| HTL COUNTER | COUNTER VALUE WHICH MANAGES HTL |

NODE DEVICE AND DATA RELAYING METHOD

CROSS-REFERENCE TO RELATED APPLICATION

This application is based upon and claims the benefit of priority from the prior Japanese Patent Application No. 2013-238132 filed on Nov. 18, 2013, the entire contents of which are incorporated herein by reference.

FIELD

The embodiments discussed herein are related to a node device and a data relaying method.

BACKGROUND

In recent years, research on an ad hoc network is being progressed in which a plurality of communication devices (hereinafter, referred to as node devices) are autonomously and distributively connected with each other (see, for example, Japanese Laid-open Patent Publication No. 2006-191218). Each node device of the ad hoc network independently constructs a network according to communication environment.

Specifically, in the ad hoc network, an access point is not installed and each node device relays a data frame received from a node device adjacent thereto (hereinafter, referred to as an adjacent node device) to other adjacent node device based on a network topology to transmit the data frame to a destination node device. In this case, each node device selects a path having a better transmission quality to transmit the data frame.

Since the network environment varies at the moment instantly, the data frame is not always transmitted to the destination node device even when each node device has transmitted the data frame based on the network topology.

For example, the data frame transmitted to the adjacent node device may be looped back. In this case, a node device which transmitted the data frame (here, the node device is referred to as a relay node device) determines that a path via the adjacent node device selected as the transmission destination is not a normal path and changes the path. Also, the relay node device retransmits the data frame which is looped back (hereinafter, referred to as the loop data) to other adjacent node device.

Further, a fraudulent node device which interferes the relaying of a frame such as a data frame also exists in the network environment. It is assumed that such a fraudulent node device fraudulently receives the data frame transmitted to the adjacent node device by, for example, the relay node device and transmits the fraudulently received data frame (hereinafter, referred to as a redundant data) to the relay node device. In this case, the relay node device erroneously determines that the data frame transmitted to the adjacent node device is looped back and changes the path based on the erroneous determination even though the path is normal.

SUMMARY

According to an aspect of the invention, a node device includes: a communication unit configured to transmit a data frame containing frequency information which indicates a number of times that the data frame is transmitted, and receive the data frame transmitted from any one of a plurality of adjacent node devices; a storage unit configured to store a table in which frame identification information for identifying the data frame and the frequency information of the data frame are associated with each other; and a control unit configured to: determine whether a destination of the received data frame is its own node device; determine, when it is determined that the destination of the received data frame is not its own node device, whether the frame identification information of the received data frame is registered in the table; determine, when it is determined that the frame identification information of the received data frame is registered in the table, whether the number of transmission times indicated by the frequency information of the received data frame is less than or equal to the number of transmission times indicated by the frequency information corresponding to the frame identification information registered in the table; update, when it is determined that the number of transmission times indicated by the frequency information of the received data frame is greater than the number of transmission times indicated by the frequency information corresponding to the frame identification information registered in the table, the frequency information corresponding to the frame identification information registered in the table with the frequency information of the received data frame; and increase, when it is determined that the number of transmission times indicated by the frequency information of the received data frame is greater than the number of transmission times indicated by the frequency information corresponding to the frame identification information registered in the table, the number of transmission times indicated by the frequency information of the received data frame, wherein the communication unit transmits the data frame for which the number of transmission times is increased to an adjacent node device which is not selected as a transmission destination of the data frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a header format of a data frame according to the First Embodiment;

FIG. 4 is a diagram explaining respective fields in the example of the header format illustrated in FIG. 3;

DESCRIPTION OF EMBODIMENTS

When the node device erroneously recognizes the redundant data as the loop data, a proper path may be changed into an erroneous path. When the path is changed into the erroneous path, it is expected that the data frame does not arrive the destination node device. Therefore, it is important to discern between the redundant data and the loop data.

Hereinafter, an embodiment regarding a technology which makes it possible to discern between the redundant data and the loop data will be described in detail with reference to the drawings.

First Embodiment

Figure 1:
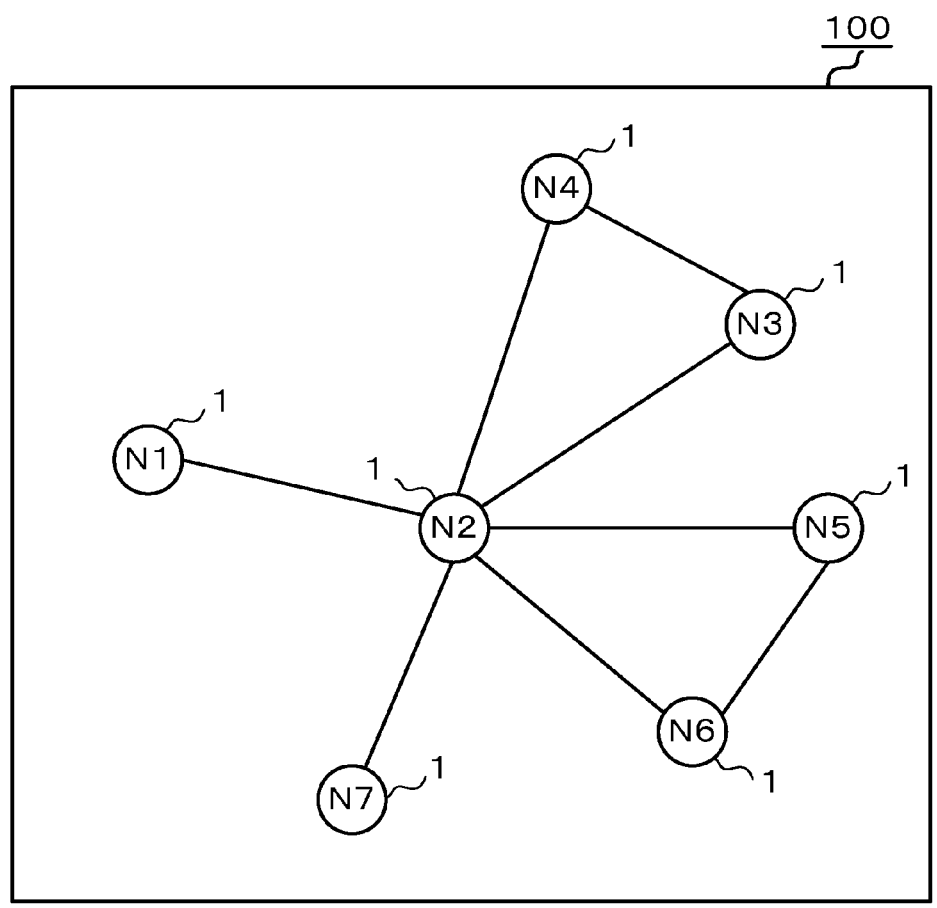
FIG. 1 is a view illustrating a portion of a configuration example of a network according to the First Embodiment.

FIG. 1 is a view illustrating a portion of a configuration example of a network 100 according to the First Embodiment. The network 100 is an example of an ad hoc network and is configured to include a plurality of node devices 1. A link, represented by a solid line in FIG. 1, exists between the node devices 1.

The node device 1 may include, for example, a metering node device such as an electric power meter or a sensor node device including various sensors. When the node device 1 is the sensor node device, the node device 1 gathers information from, for example, a sensor according to an instruction from a data server or gathers information autonomously, and transmits the gathered information (data frame) to the data server.

The node device 1 is denoted by "Ni" (i=1, . . . , 7) in FIG. 1. It is assumed that a reference numeral "Ni" indicates an ID (IDentification) which may uniquely identify the node device 1. Hereinafter, the number "1" is used as a reference numeral that indicates all the node devices and a "node ID" is used as a reference numeral that indicates an individual node device.

The link may be a wireless link or a wired link. For example, referring to FIG. 1, a case where the node device N1 and the node device N2 are directly communicable with each other without relaying over the other node device 1 is referred to as "A link exists between the node device N1 and the node device N2".

The link changes dynamically. For example, the link may be newly established between the node devices 1 or the link which has been established may be removed due to, for example, a weather or shield. Further, for example, when the node device 1 is a movable device, the presence and absence of the link may be changed due to variation in distance between the node devices 1. Further, a new link may be established or the link which has been existed is removed due to, for example, connection switching of cables, or the link may be removed due to a failure, such as disconnection of a cable.

Figure 2:
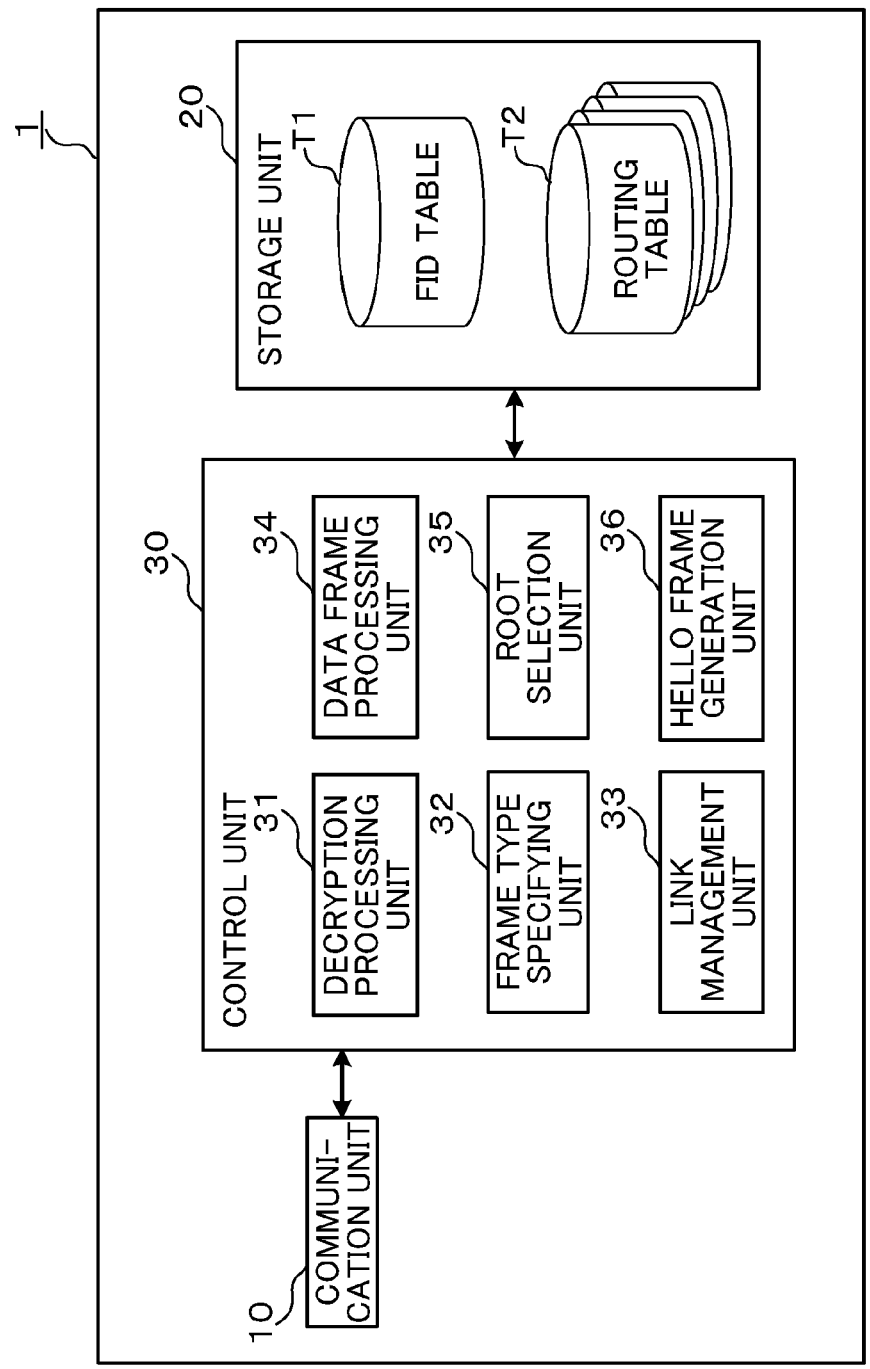
FIG. 2 is a view illustrating a configuration example of a node device constituting the network according to the First Embodiment.

Subsequently, descriptions will be made on the node device 1 according to Embodiment 1 with reference to FIG. 2. FIG. 2 is a functional block diagram illustrating a configuration example of the node device 1 constituting the network 100 according to the First Embodiment.

The node device 1 is configured to include a communication unit 10, a storage unit 20 and a control unit 30 as illustrated in FIG. 2.

The communication unit 10 is configured by, for example, a communication module and communicates with other node device 1. For example, the communication unit 10 transmits and receives the data frame. When the frame is received, the communication unit 10 outputs the received frame to a decryption processing unit 31 (details thereof will be described below).

The storage unit 20 is configured by, for example, a RAM (Random Access Memory), ROM (Read Only Memory) or flash memory. The storage unit 20 serves as a work area of, for example, an MPU (Micro-Processing Unit) which constitutes the control unit 30, a program area which stores various programs such as an operation program for controlling the entirety of the node device 1 and a data area which stores various data such as, a FID table T1 or a routing table T2 (details thereof will be described below). Further, an ID of its own node is also stored in the data area.

Figure 3:
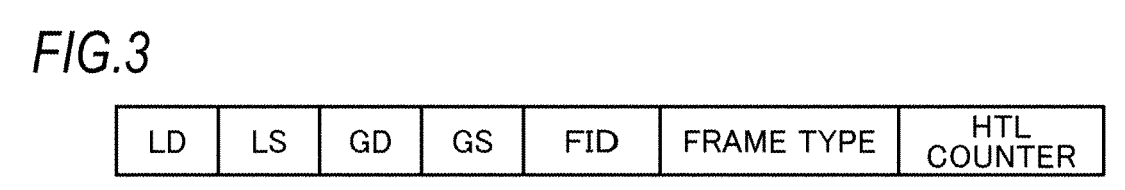

Descriptions will be made on a header of a data frame generated by a data frame processing unit 34 (details thereof will be described below) with reference to FIG. 3 and FIG. 4. FIG. 3 is a view illustrating an example of a header format of a data frame according to the First Embodiment. FIG. 4 is a diagram explaining respective fields in the example of the header format illustrated in FIG. 3.

The header of the data frame according to the First Embodiment includes fields for LD (Local Destination), LS (Local Source), GD (Global Destination), GS (Global Source), FID (Frame IDentification), frame type and HTL (Hop ToLive) counter as illustrated in FIG. 3.

The LD is a node ID of an adjacent node device 1 which becomes a transmission destination, and a root selection unit 35 (details thereof will be described below) of the node device 1 which becomes the LS refers to a routing table T2 to select the LD. For example, referring to FIG. 1, the LD of the data frame transmitted by the node device N1 to the node device N2 becomes N2.

The LS is a node ID of the adjacent node device 1 of the transmission source when viewed from the node device 1 of reception side, and the data frame processing unit 34 of the node device 1 which becomes the LS stores an ID of its own node in the "LS" field. For example, referring to FIG. 1, the LS of the data frame transmitted by the node device N1 to the node device N2 becomes N1.

The GD is a node ID of the node device 1 which becomes the final destination. The GS is a node ID of the issuance source node device 1 of the data frame (hereinafter, referred to also as an issuance source node device). For example, referring to FIG. 1, when the data frame issued by the node device N1 is relayed in an order of the node device N2 and the node device N5 to be finally transmitted to the node device N6, the GD of the data frame is N6 and the GS is N1.

The FID is a frame ID in an issuance source node device 1 of a frame. That is, the FID generated by the issuance source node device 1 is stored in the "FID" field of the header. That is, the GS and FID are combined with each other to form frame identification information which may uniquely discern the frame.

The frame type is information which indicates a type of frame, and information indicating that the type of frame is a data frame is stored in the "frame type" field in the data frame. At least two frames, such as a Hello frame and a data frame as the type of frame, exist in the First Embodiment.

In the meantime, the Hello frame is a frame transmitted regularly by a device participating in an ad hoc network in order to decide a path by exchanging path information of network between the devices. The Hello frame is generated by a Hello frame generation unit 36 (details thereof will be described below) and is a frame for notifying the existence of its own node device 1 to other node device 1, and includes information necessary for preparing the path. The data frame is a frame which contains information intended to be delivered by the issuance source node device 1 (GS) to the node device 1 (GD) which becomes the final destination, as a payload.

An HTL counter is a counter value for limiting the number of hops and it is assumed that the HTL counter is configured in such a manner that when the counter value reaches "0" (zero), the transmission process is not performed in the First Embodiment. An initial value of the HTL counter is set by a data frame processing unit 34 of the issuance source node device 1 (GS) of the data frame and is decremented by the data frame processing unit 34 of the node device 1 of the transmission source when the data frame is transmitted. In the meantime, the initial value of the HTL counter is set to "30" in the First Embodiment. Further, the counter value is not limited to the HTL counter but may include a value capable of managing the number of transmission times of the data frame.

Subsequently, descriptions will be made on the FID table T1 and the routing table T2 stored in the data area of the storage unit 20, with reference to FIG. 5 and FIG. 6, respectively.

Figure 5:
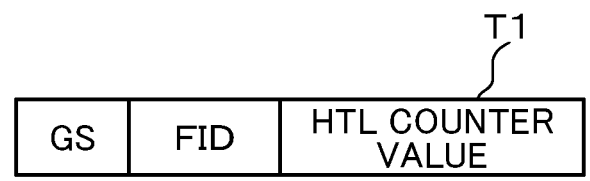
FIG. 5 is a diagram illustrating an example of a FID (Frame Identification) table according to the First Embodiment.

FIG. 5 is a diagram illustrating an example of an FID table T1 according to the First Embodiment. The FID table T1 according to the First Embodiment is managed by the data frame processing unit 34 and is a table in which the "GS", the "FID" and "HTL counter value" are associated with one another as illustrated in FIG. 5.

Figure 6:
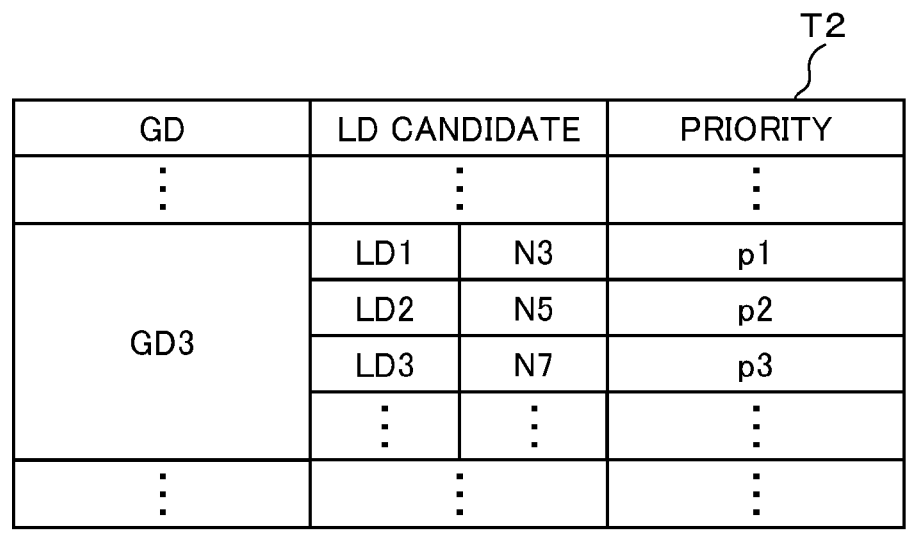
FIG. 6 is a diagram illustrating an example of a routing table.

FIG. 6 is a diagram illustrating an example of a routing table T2. The routing table T2 is managed by the link management unit 33 (details thereof will be described below) and is a table in which the information needed for selecting the adjacent node device 1 which becomes the transmission destination of the data frame is managed for each GD. For example, the routing table T2 is a table in which the "LD candidate" and the "priority" are associated with each other for each GD.

The routing table T2 illustrated in FIG. 6 is an example of the routing table T2 stored in the node device N2 illustrated in FIG. 1, and a priority is assumed to be set in an order of p1>p2>p3> . . . .

The "LD candidate" is a node ID of an adjacent node device 1 for which a link exists. The "priority" indicates a priority used for selecting an LD among the LD candidates. The priority may be varied and the link management unit 33 may change the priority based on, for example, whether transmission of the data frame is successful.

Referring back to FIG. 2, the control unit 30 is configured by, for example, an MPU to execute an operation program stored in the program area of the storage unit 20. The control unit 30 implements functions of the decryption processing unit 31, the frame type specifying unit 32, the link management unit 33, the data frame processing unit 34, the root selection unit 35 and the Hello frame generation unit 36 as illustrated in FIG. 2, and also executes a control process which controls the entirety of the node device 1 or a process such as a frame type specifying process and a transmission process for which details will be described below.

The decryption processing unit 31 executes the decryption processing which corresponds to an encryption (for example, encryption using a fixed key, or common key between LD and LS) according to a predetermined encryption algorithm. Specifically, when a frame is received, the communication unit 10 outputs the received frame to the decryption processing unit 31. When the received frame is encrypted, the decryption processing unit 31 executes a decryption processing to output the decrypted frame to the frame type specifying unit 32. In the meantime, when the received frame is not encrypted, the decryption processing unit 31 outputs the received frame to the frame type specifying unit 32 without decrypting the received frame.

The frame type specifying unit 32 specifies the type of frame received in the communication unit 10. Specifically, the frame type specifying unit 32 interprets the header of the decrypted frame decrypted by the decryption processing unit 31 as needed and specifies the type of frame based on the frame type of the header. Also, when the specified type of frame is a Hello frame, the frame type specifying unit 32 outputs the received frame to the link management unit 33, and when the specified type of frame is a data frame, the frame type specifying unit 32 outputs the received frame to the data frame processing unit 34.

The link management unit 33 manages the routing table T2. More specifically, when the received frame is the Hello frame, the link management unit 33 interprets the received Hello frame, and updates and generates the routing table T2 based on a result of the interpretation. Further, when an instruction to generate the routing table T2 is input from the root selection unit 35, the link management unit 33 generates the routing table T2 which corresponds to a GD based on, for example, the Hello frame received previously.

Further, the link management unit 33 changes the priority of the routing table T2 based on whether the data frame is successful. For example, when the transmission of the data frame failed (e.g., when the data frame is looped back), the link management unit 33 sets the priority which corresponds to the "LD candidate" to which transmission of the data frame failed, to the lowest level.

The data frame processing unit 34 processes the received data frame. More specifically, first, when the data frame is input from the frame type specifying unit 32, the data frame processing unit 34 interprets the header of the input data frame to determine whether the LD is coincident with its own node ID. Also, when the LD is not coincident with its own node ID, the data frame processing unit 34 discards the received data frame.

When the LD is coincident with its own node ID, the data frame processing unit 34 further determines whether the GD is coincident with its own node ID. That is, the data frame processing unit 34 determines whether the final destination of the received data frame is its own node device 1.

When it is determined that the final destination of the received data frame is its own node device 1, the data frame processing unit 34 outputs the received data frame to an upper layer. The upper layer processes the received data frame in response to an input of the data frame.

When the final destination of the received data frame is other node device 1, the data frame processing unit 34 compares the header with the FID table T1 to determine whether a combination of a GS and a FID that is coincident with a combination of the GS and the FID of the header is registered in the FID table T1. That is, the data frame processing unit 34 determines whether the same data frame has already been received.

When the combination of the GS and the FID that is coincident with the combination of the GS and the FID of the header is registered in the FID table T1, and the value of the HTL counter of the header is greater than or equal to the value of the HTL counter which has been already contained as an entry in the FID table T1, the data frame processing unit 34 determines that the received data frame is redundant data. That is, the data frame processing unit 34 determines whether the number of transmission times of the received data frame is less than or equal to the number of transmission times indicated by the HTL counter which is contained as an entry, and when it is determined that the number of transmission times of the received data frame is less than or equal to the number of transmission times indicated by the HTL counter which is contained as an entry, the data frame processing unit 34 determines that the received data frame is redundant data.

When it is determined that the value of the HTL counter is less than the value of the HTL counter which is contained as an entry, the data frame processing unit 34 determines that the received data frame is loop data. That is, when the number of transmission times of the received data frame is greater than the number of transmission times indicated by the HTL counter which is contained as an entry, the data frame processing unit 34 determines that the received data frame is loop data. As described above, it is possible to discern between loop data and redundant data in the First Embodiment.

Also, when it is determined that the received data frame is redundant data, the data frame processing unit 34 discards the received data frame, and when it is determined that the received data frame is loop data, the data frame processing unit 34 updates a corresponding HTL counter of the FID table T1 with the HTL counter of the header, and instructs the root selection unit 35 to reselect the LD. In this case, the data frame processing unit 34 notifies the link management unit 33 that the data frame is to be looped back and the LD to which the loop data is transmitted. By doing this, the link management unit 33 may appropriately change the priority of the routing table T2.

When it is determined that the combination of the GS and the FID that is coincident with the combination of the GS and the FID of the header is not registered in the FID table T1, that is, when the data frame is a data frame which is received for the first time, the data frame processing unit 34 processes registration of the data frame in the FID table T1. More specifically, the data frame processing unit 34 associates the GS, FID and HTL counter value of the header with each other to be registered in the FID table T1.

The data frame processing unit 34 instructs the root selection unit 35 to select the LD in order to transmit the received data frame.

Further, when the selected LD is notified from the root selection unit 35, the data frame processing unit 34 performs the transmission processing of the data frame. More specifically, when the selected LD is notified from the root selection unit 35, the data frame processing unit 34 decrements the HTL counter of the header to set its own node ID in the LS of the header and sets the LD selected from the root selection unit 35 in the LD of the header.

Also, the data frame processing unit 34 encrypts the data frame (for example, encryption using a fixed key, or common key between LD and LS) according to a predetermined encryption algorithm and then transmits the encrypted data frame to the adjacent node device 1, which is the set LD, through the communication unit 10.

Further, the data frame processing unit 34 generates the data frame of the header illustrated in FIG. 3 in response to a request from the upper layer. In this case, the data frame processing unit 34 sets the HTL counter to an initial value. Further, the data frame processing unit 34 encrypts the generated data frame according to a predetermined encryption algorithm and transmits the encrypted data frame to other node device 1 through the communication unit 10.

When the received data frame is needed to be transmitted to other node device 1, the root selection unit 35 refers to the routing table T2 to select the adjacent node device 1, that is, to select the LD, which becomes the transmission destination of the data frame. The root selection unit 35 notifies the selected LD to the data frame processing unit 34.

More specifically, when an instruction to select the LD is received from the data frame processing unit 34, the root selection unit 35 specifies the routing table T2 which corresponds to the GD of a data frame which is a target to be transmitted. Also, when the routing table T2 was able to be specified, the root selection unit 35 selects the adjacent node device 1, that is, selects the LD, of the transmission destination based on the priority of the specified routing table T2.

When the routing table T2, which corresponds to the GD of a data frame which is a target to be transmitted, was not able to be specified, the root selection unit 35 instructs the link management unit 33 to generate the routing table T2 which corresponds to the GD of a data frame which is a target to be transmitted. Also, the root selection unit 35 selects the adjacent node device 1, that is, selects the LD, of the transmission destination based on the priority of the specified routing table T2 generated by the link management unit 33.

For example, when the data frame which is a target to be transmitted is not loop data, that is, the data frame is a data frame which is received for the first time, the root selection unit 35 selects an LD candidate having the highest priority among the LD candidates except for the adjacent node device 1(LS) of the transmission source, as the LD.

Further, for example, when the data frame which is a target to be transmitted is the loop data, the root selection unit 35 selects an LD candidate having the highest priority as the LD among the LD candidates except for the adjacent node device 1(LS) of the transmission source and an adjacent node device 1 to which transmission of the data frame is attempted.

In this case, when the LD was not able to be specified, the root selection unit 35 selects the adjacent node device 1(LS) of the transmission source as the LD in order to return the data frame which is a target to be transmitted to the adjacent node device 1 (LS) of the transmission source.

The Hello frame generation unit 36 generates the Hello frame at a predetermined timing (for example, regularly) and transmits the generated Hello frame to the adjacent node device 1 through the communication unit 10.

Figure 7:
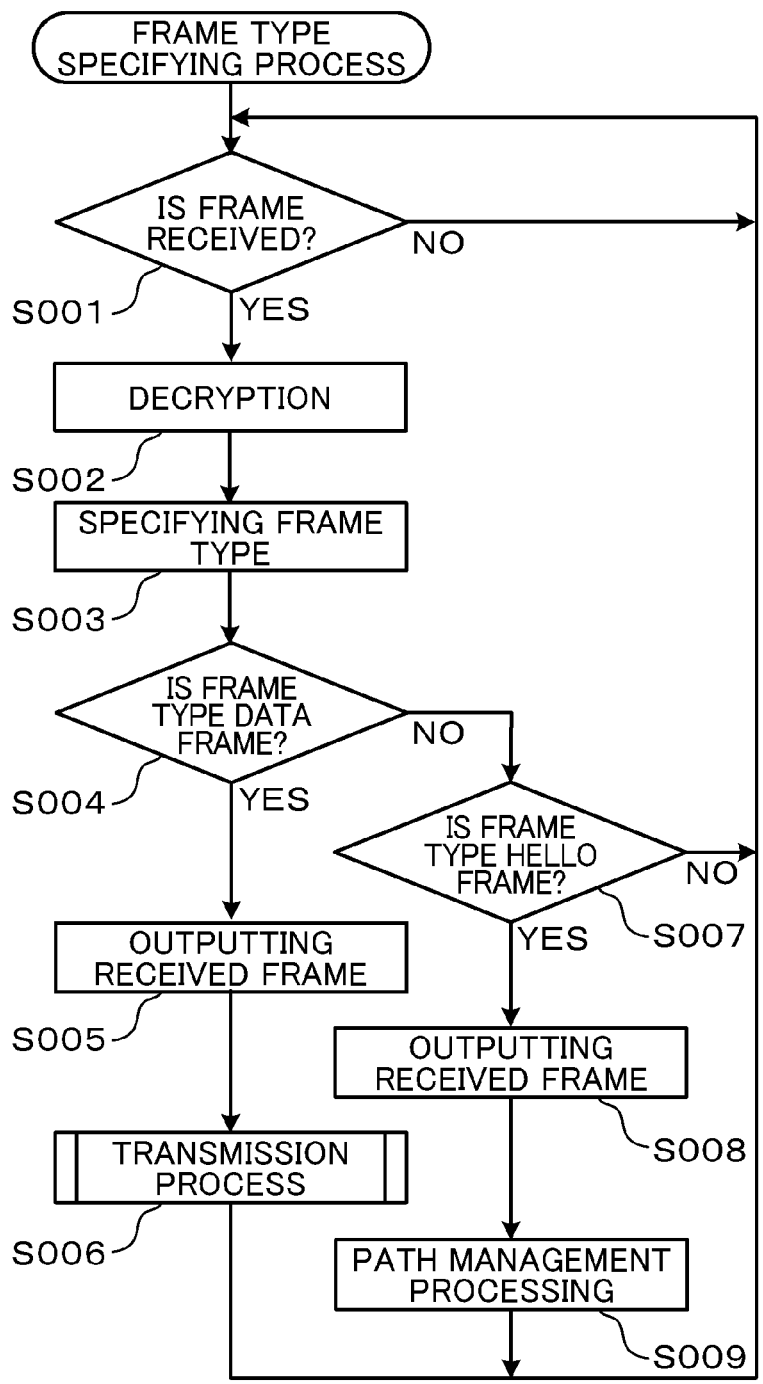
FIG. 7 is a view illustrating an example of a flowchart explaining the flow of a frame type specifying process according to the First Embodiment.

Subsequently, descriptions will be made on a flow of a frame type specifying process according to the First Embodiment with reference to FIG. 7. FIG. 7 is a view illustrating an example of a flowchart explaining the flow of a frame type specifying process according to the First Embodiment. The frame type specifying process begins with reception of frame, as a trigger.

The decryption processing unit 31 determines whether a frame is received (Operation S001). When it is determined by the decryption processing unit 31 that the frame is not received ("NO" at Operation S001), the frame type specifying process repeats the processing of Operation S001 and waits until the frame is received.

When it is determined that the frame is received ("YES" at Operation S001), the decryption processing unit 31 decrypts the received frame as needed and then outputs the received frame to the frame type specifying unit 32 (Operation S002). Also, the frame type specifying unit 32 interprets the header of the decrypted frame as needed to specify a type of frame based on the frame type of the header (Operation S003), and determines whether the specified type of frame is a data frame (Operation S004).

When it is determined that frame type is the data frame ("YES" at Operation S004), the frame type specifying unit 32 outputs the received frame to the data frame processing unit 34 (Operation S005). The data frame processing unit 34 performs the transmission process of the received data frame (Operation S006), the process goes back to Operation S001 and the processes described above are repeated.

When it is determined that the frame type is not the data frame ("NO" at Operation S004), the frame type specifying unit 32 further determines whether the specified type of frame is a Hello frame (Operation S007).

When it is determined by the frame type specifying unit 32 that the frame type is also not the Hello frame ("NO" at Operation S007), the process goes back to Operation S001 and the processes described above are repeated.

When it is determined that the frame type is the Hello frame ("YES" at Operation S007), the frame type specifying unit 32 outputs the received frame to the link management unit 33 (Operation S008). The link management unit 33 performs a predetermined path management processing such as creating or updating the routing table T2 (Operation S009), and the process goes back to Operation S001 and the processes described above are repeated.

Figure 8:
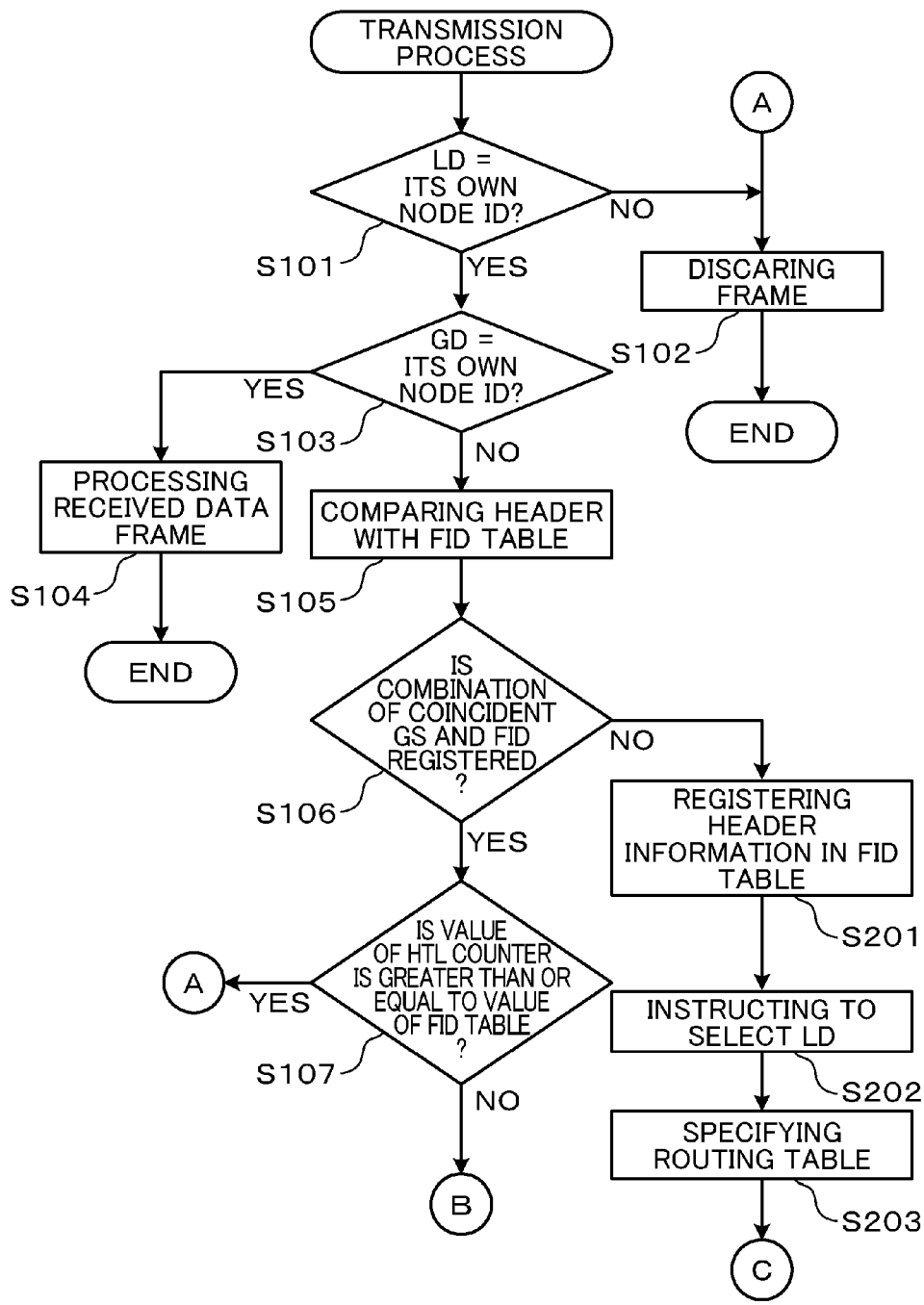
FIG. 8 is a view illustrating a portion of an example of a flowchart for explaining the flow of a transmission process according to the First Embodiment.
Figure 9:
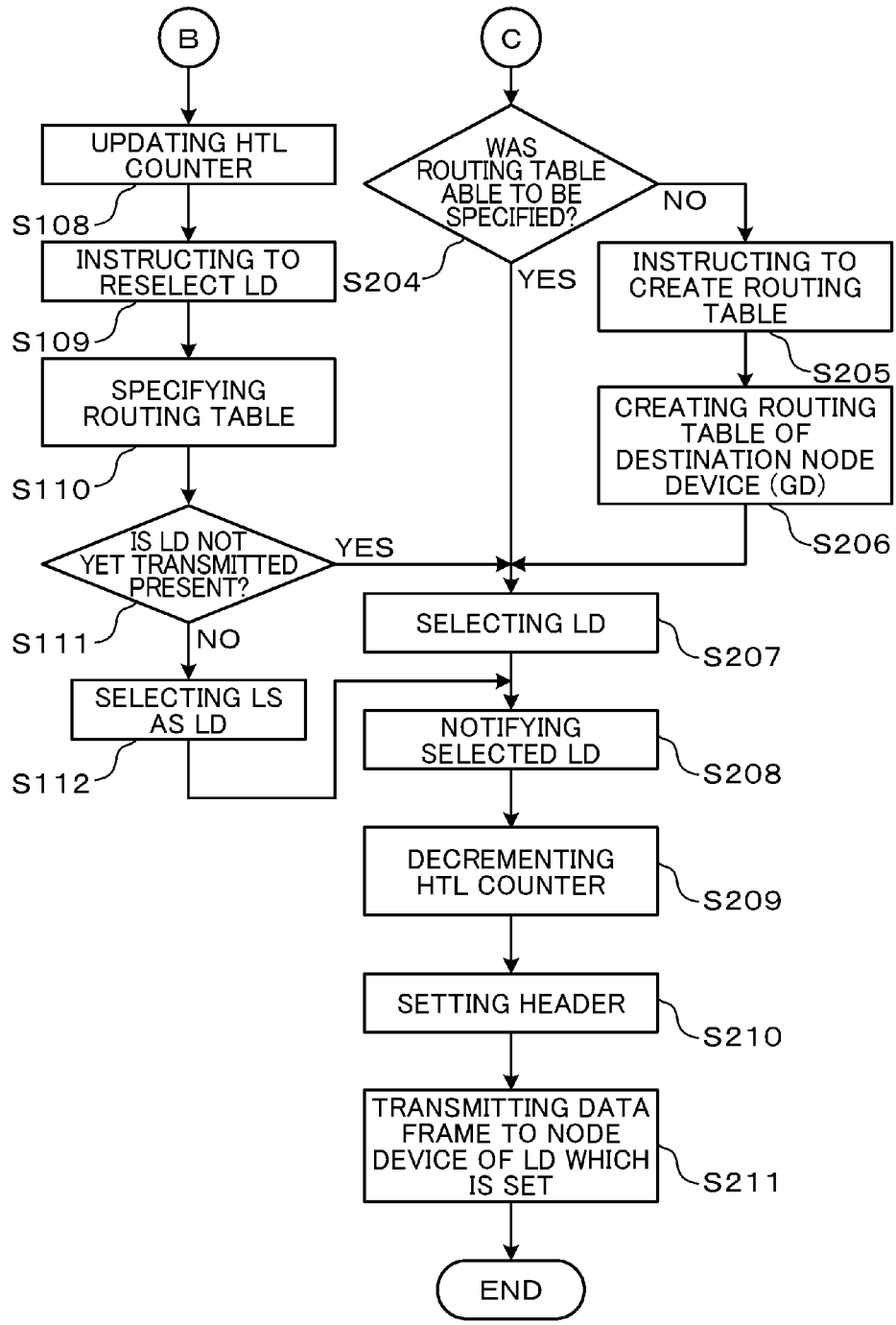
FIG. 9 is a view illustrating another portion of the example of the flowchart for explaining the flow of a transmission process according to the First Embodiment.

Subsequently, descriptions will be made on the flow of the transmission process according to the First Embodiment with reference to FIG. 8 and FIG. 9. FIG. 8 and FIG. 9 are views illustrating a portion and another portion of an example of a flowchart for explaining the flow of the transmission process according to the First Embodiment, respectively. The transmission process is a process corresponding to the processing of Operation S006 of the frame type specifying process described above.

The data frame processing unit 34 interprets the header of the received data frame to determine whether the LD is coincident with its own node ID (Operation S101).

When it is determined that the LD is not coincident with its own node ID ("NO" at Operation S101), the data frame processing unit 34 discards the received data frame (Operation S102). Then, the transmission process ends.

When it is determined that the LD is coincident with its own node ID ("YES" at Operation S101), the data frame processing unit 34 further determines whether the GD is coincident with its own node ID (Operation S103). That is, the data frame processing unit 34 determines whether the final destination of the received data frame is its own node device 1.

When it is determined that the GD is coincident with its own node ID ("YES at Operation S103), the data frame processing unit 34 outputs the received data frame to the upper layer and the upper layer processes the received data frame in response to an input of the data frame (Operation S104). Then, the transmission process ends.

When it is determined that the GD is not coincident with its own node ID ("NO" at Operation S103), the data frame processing unit 34 compares the header with the FID table T1 (Operation S105) to determine whether a combination of a GS and a FID that is coincident with a combination of the GS and the FID of the header is registered in the FID table T1 (Operation S106). That is, the data frame processing unit 34 determines whether the same data frame has already been received.

When it is determined that the combination of the GS and the FID that is coincident with the combination of the GS and the FID of the header is registered in the FID table T1 ("YES" at Operation S106), the data frame processing unit 34 further determines whether the HTL counter value of the header is greater than or equal to the value of the HTL counter which is contained as an entry for which the combination of the GS and the FID is coincident with the combination of the GS and the FID of the header (Operation S107).

When it is determined that the value of the HTL counter of the header is greater than or equal to the value of the HTL counter which is contained as an entry ("YES" at Operation S107), the data frame processing unit 34 determines that the received data frame is redundant data and discards the received data frame (Operation S102). Then, the transmission process ends.

When it is determined that the value of the HTL counter of the header is less than the value of the HTL counter which is contained as an entry ("NO" at Operation S107), the data frame processing unit 34 determines that the received data frame is loop data to update a corresponding HTL counter of the FID table T1 with the HTL counter of the header (Operation S108), and instructs the root selection unit 35 to reselect the LD (Operation S109).

The root selection unit 35 which has received the instruction to reselect the LD specifies the routing table T2 corresponding to the GD of the data frame which is a target to be transmitted (Operation S110) to determine whether there is an "LD candidate" to which the data frame which is a target to be transmitted is not yet transmitted (Operation S111).

When it is determined by the root selection unit 35 that there is an "LD candidate" to which the data frame which is a target to be transmitted is not yet transmitted ("YES" at Operation S111), the process proceeds to processing of Operation S207 which will be described. In the meantime, when it is determined that there is no "LD candidate" to which the data frame which is a target to be transmitted is not yet transmitted ("NO" at Operation S111), the root selection unit 35 selects the LS as an LD (Operation S112), and the process proceeds to processing of Operation S208. That is, the root selection unit 35 performs the processing for returning the received data frame to the adjacent node device 1 of the transmission source.

Here, in the processing of Operation S106, when it is determine that the combination of the GS and the FID that is coincident with a combination of the GS and the FID of the header is not registered in the FID table T1 ("NO" at Operation S106), that is, when it is determine that the frame is a data frame which is received for the first time, the data frame processing unit 34 associates the GS, FID and HTL counter value of the header with one another to be registered in the FID table T1 (Operation S201).

Also, the data frame processing unit 34 instructs the root selection unit 35 to select the LD (Operation S202).

The root selection unit 35 which has received the instruction to select the LD specifies the routing table T2 corresponding to the GD of the data frame which is a target to be transmitted (Operation S203) to determine whether the routing table T2 was able to be specified (Operation S204). When it is determined that the routing table T2 was not able to be specified ("NO" at Operation S204), the root selection unit 35 instructs the link management unit 33 to generate the routing table T2 which corresponds to the GD of the data frame which is a target to be transmitted (Operation S205).

The link management unit 33 which has received the instruction to generate the routing table T2 generates the routing table T2, for which an instruction to generate is issued, which corresponds to the GD (Operation S206).

Also, the root selection unit 35 selects the adjacent node device 1, that is, selects the LD, of the transmission destination based on the priority of the routing table T2 specified by the processing of Operation S110 or Operation S203 or generated in the processing of Operation S206 (Operation S207).

The root selection unit 35 notifies the selected LD to the data frame processing unit 34 (Operation S208). The data frame processing unit 34 which has been notified of the selected LD decrements the value of the HTL counter of the header (Operation S209) and sets the header (Operation S210).

Also, the data frame processing unit 34 encrypts the data frame according to a predetermined encryption algorithm and then transmits the encrypted data frame to the adjacent node device 1 which is the set LD, that is, the LD selected by the root selection unit 35 through the communication unit 10 (Operation S211). Then, the process ends.

Subsequently, descriptions will be made on a flow of the transmission process according to the First Embodiment with reference to FIG. 6, FIG. 8 to FIG. 12.

Figure 10:
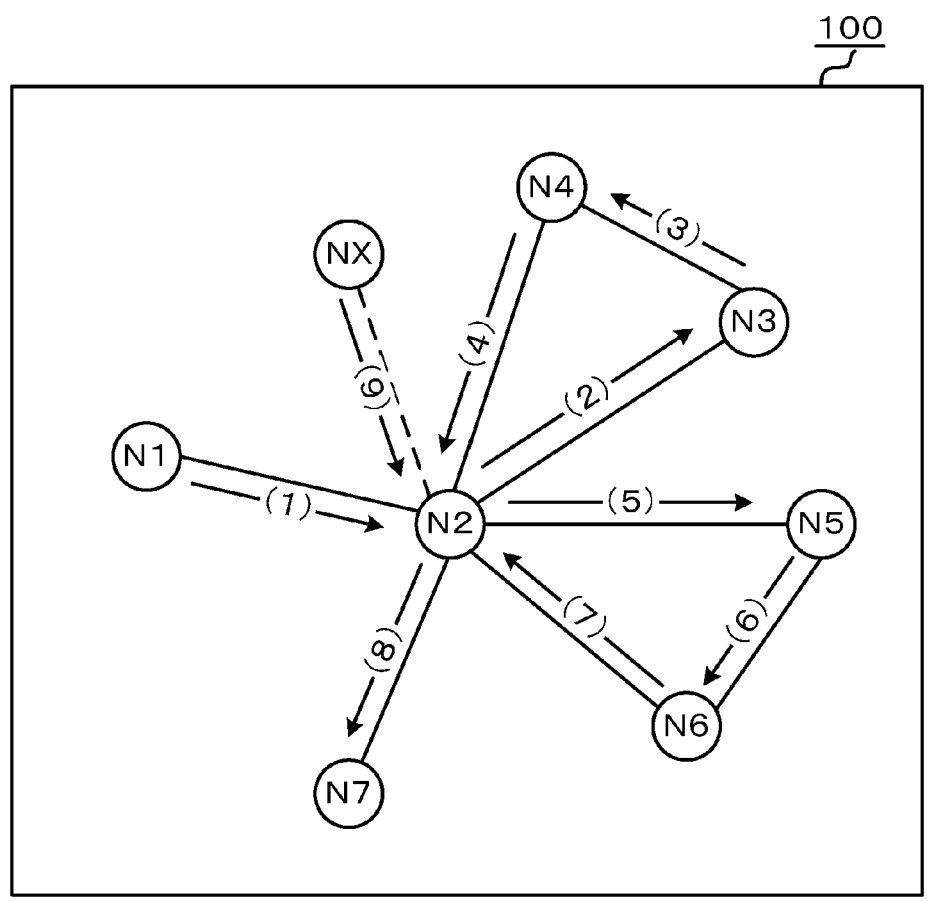
FIG. 10 is a view illustrating a portion of the example of the network configuration for explaining a specific example according to the First Embodiment.
Figure 11:
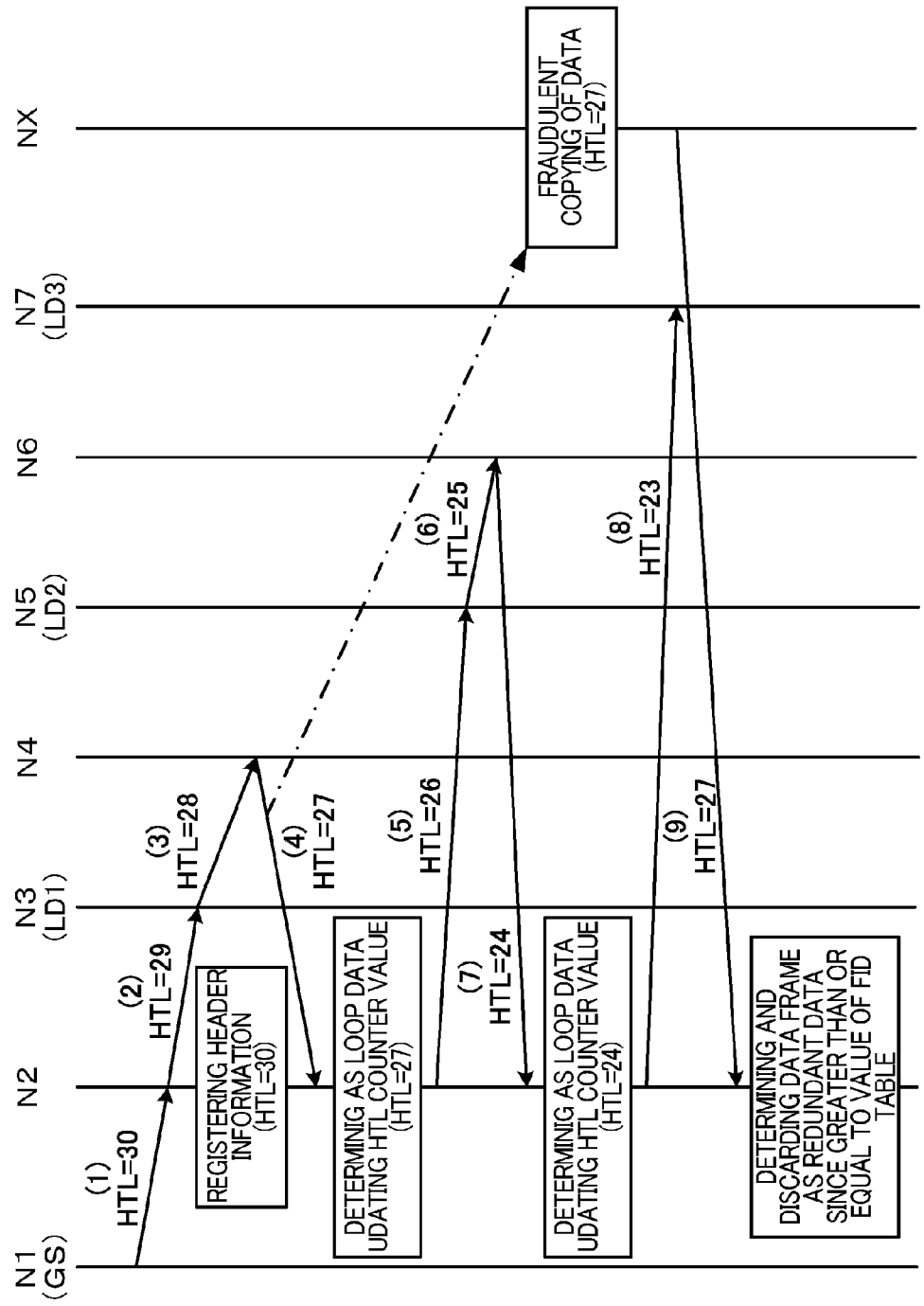
FIG. 11 is a timing chart corresponding to the example illustrated in FIG. 10.
Figure 12:
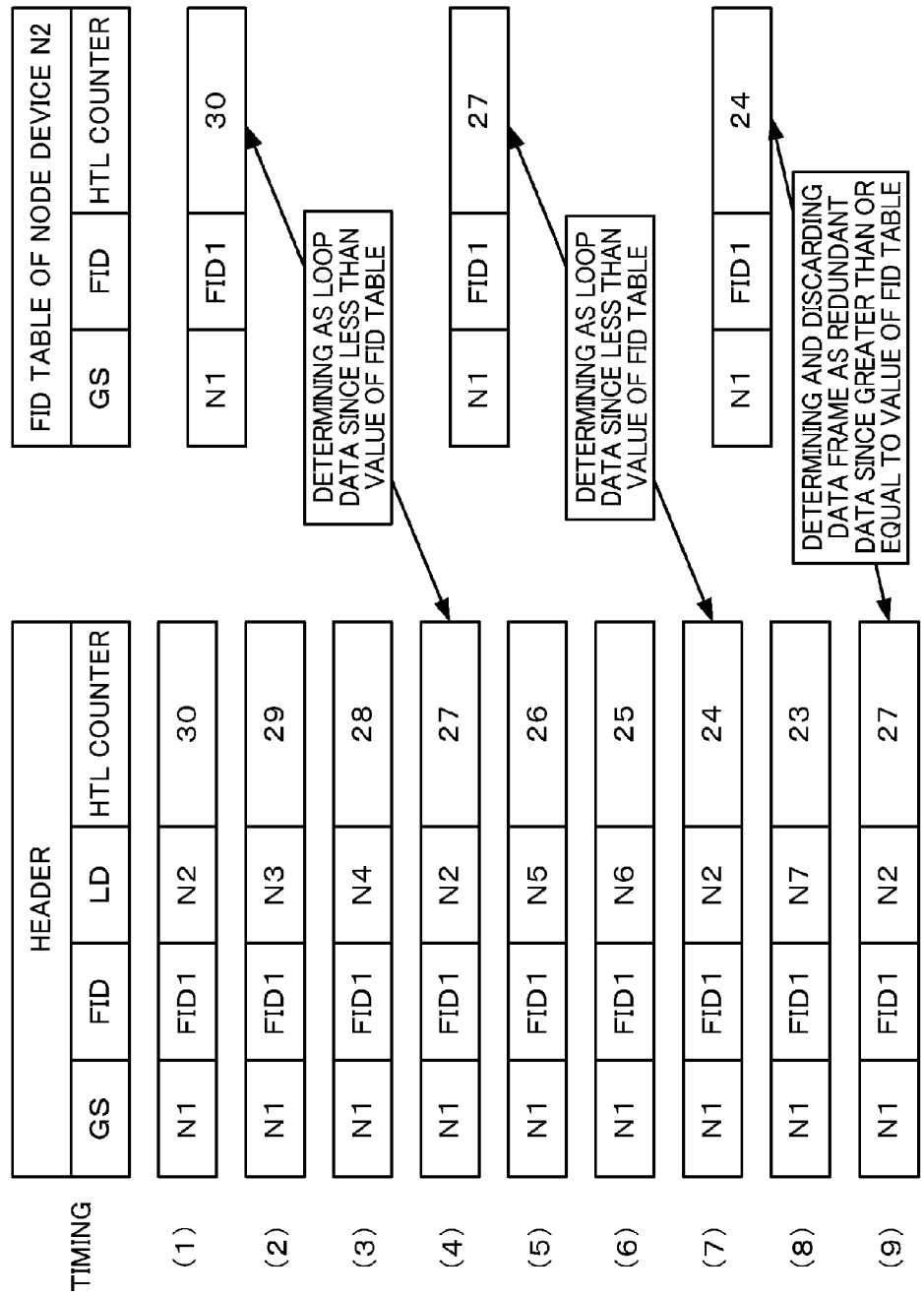
FIG. 12 is a diagram illustrating the contents of a header and a FID table of a node device N2 at each timing of the timing chart illustrated in FIG. 11.

FIG. 10 is a view illustrating a portion of the configuration example of the network 100 for explaining a specific example according to the First Embodiment. In the meantime, a node device NX illustrated in FIG. 10 is a node device which is not related to the network 100 in the specific example and fraudulently receives the data frame to make a retransmission attack. FIG. 11 is a timing chart corresponding to the example illustrated in FIG. 10. FIG. 12 is a diagram illustrating the contents of a header and a FID table of a node device N2 at each timing of the timing chart illustrated in FIG. 11.

In the meantime, a plurality of different data frames may be simultaneously transmitted through the network 100 but here, descriptions will be made by focusing on a relay flow of a single data frame. Further, the number represented inside "( )" in the drawing such as FIG. 11 is assigned for identifying a timing and these numbers are assumed to be corresponded with one another in FIG. 10 to FIG. 12. Further, in the specific example, a path which spans from the node device N2 via the adjacent node device N7 is assumed to be a normal path.

Referring to FIG. 10 and FIG. 11, at timing (1), the node device N1 is a GS, generates a data frame for which the GD is set as GD3 and the FID is set as FID1, and transmits the generated data frame to the node device N2 after encrypting the data frame. The GS, FID, LD and HTL counter value of the data frame at timing (1) are N1, FID1, N2 and "30", respectively, as illustrated in FIG. 12.

Referring to FIG. 8 and FIG. 9, since the data frame received by the node device N2 is a data frame which is received for the first time ("NO" at Operation S106), the node device N2 associates GS (N1), FID (FID1) and HTL counter value (30) of the received data frame with one another to be registered in the FID table T1 as illustrated in FIG. 12 (Operation S201).

Also, the node device N2 specifies the routing table T1 corresponding to GD3 (Operation S203). Referring to FIG. 6, since the node device N3 has the highest priority among the LD candidates for GD3, the node device N2 selects the node device N3 as an LD (Operation S207), decrements the value of the HTL counter of the (Operation S209), and at the same time, sets the LS of the header as N2 and the LD as N3 (Operation S210).

As illustrated in FIG. 10 and FIG. 11, at timing (2), the node device N2 transmits an encrypted data frame to a node device N3 (Operation S211). At timing (2), GS, FID, LD, HTL counter of the data frame becomes N1, FID1, N3 and "29", respectively, as illustrated in FIG. 12.

Referring to FIG. 8 and FIG. 9, since the data frame received by the node device N3 is a data frame which is received for the first time ("NO" at Operation S106), the node device N3 registers the header information in the FID table T1 (Operation S201). In the specific example, when it is assumed that the node device N3 selects the node device N4 as the transmission destination of the data frame, the node device N3 decrements the value of the HTL counter of the header (Operation S209), and at the same time, sets the LS and the LD of the header as N3 and N4, respectively (Operation S210).

Also, as illustrated in FIG. 10 and FIG. 11, at timing (3), the node device N3 transmits the encrypted data frame to the node device N4. At timing (3), GS, FID, LD, HTL counter of the data frame becomes N1, FID1, N4 and "28", respectively, as illustrated in FIG. 12.

Referring to FIG. 8 and FIG. 9, since the data frame received by the node device N4 is a data frame which is received for the first time ("NO" at Operation S106), the node device N4 registers the header information in the FID table T1 (Operation S201). In the specific example, when it is assumed that the node device N4 selects the node device N2 as the transmission destination of the data frame, the node device N4 decrements the value of the HTL counter of the header (Operation S209), and at the same time, sets the LS and the LD of the header as N4 and N2, respectively (Operation S210).

Also, as illustrated in FIG. 10 and FIG. 11, at timing (4), the node device N4 transmits the encrypted data frame to the node device N2. At timing (4), GS, FID, LD, HTL counter of the data frame becomes N1, FID1, N2 and "27", respectively, as illustrated in FIG. 12.

Referring to FIG. 8 and FIG. 9, since the combination of GS (N1) and FID (FID1) of the header is registered in the FID table T1 of the node device N2 ("YES" at Operation S106), the node device N2 which has received the data frame compares the HTL counter (of which value is "27") of the header with the corresponding HTL counter (of which value is "30") of the FID table T1. In this case, since the HTL counter (of which value is "27") of the header is less than the corresponding HTL counter (of which value is "30") of the FID table T1 ("NO" at Operation S107), the node device N2 determines that the received data frame is the loop data.

Accordingly, the node device N2 updates the corresponding HTL counter of the FID table T1 with the HTL counter (of which value is "27") of the header (Operation S108). Referring to FIG. 6, since the node device N5 has the next highest priority after the node device N3 among the LD candidates for the GD3, the node device N2 selects the node device N5 as the LD (Operation S207), decrements the value of HTL counter of the header (Operation S209), and at the same time, sets the LS and the LD of the header as N2 and N5, respectively (Operation S210).

Also, as illustrated in FIG. 10 and FIG. 11, at timing (5), the node device N2 transmits the encrypted data frame to the node device N5. At timing (5), GS, FID, LD, HTL counter of the data frame becomes N1, FID1, N5 and "26", respectively, as illustrated in FIG. 12.

Referring to FIG. 8 and FIG. 9, since the data frame received by the node device N5 is a data frame which is received for the first time ("NO" at Operation S106), the node device N5 registers the header information in the FID table T1 (Operation S201). In the specific example, when it is assumed that the node device N5 selects the node device N6 as the transmission destination of the data frame, the node device N5 decrements the value of the HTL counter of the header (Operation S209), and at the same time, sets the LS and the LD of the header as N5 and N6, respectively (Operation S210).

Also, as illustrated in FIG. 10 and FIG. 11, at timing (6), the node device N5 transmits the encrypted data frame to the node device N6. At timing (6), GS, FID, LD, HTL counter of the data frame becomes N1, FID1, N6 and "25", respectively, as illustrated in FIG. 12.

Referring to FIG. 8 and FIG. 9, since the data frame received by the node device N6 is a data frame which is received for the first time ("NO" at Operation S106), the node device N6 registers the header information in the FID table T1 (Operation S201). In the specific example, when it is assumed that the node device N6 selects the node device N2 as the transmission destination of the data frame, the node device N6 decrements the value of the HTL counter of the header (Operation S209), and at the same time, sets the LS and the LD of the header as N6 and N2, respectively (Operation S210).

Also, as illustrated in FIG. 10 and FIG. 11, at timing (7), the node device N6 transmits the encrypted data frame to the node device N2. At timing (7), GS, FID, LD, HTL counter of the data frame becomes N1, FID1, N2 and "24", respectively, as illustrated in FIG. 12.

Referring to FIG. 8 and FIG. 9, since the combination of GS (N1) and FID (FID1) of the header has already been registered in the FID table T1 of the node device N2 ("YES" at Operation S106), the node device N2 which has received the data frame compares HTL counter (of which value is "24") of the header with the corresponding HTL counter (of which value is "27") of the FID table T1. In this case, since HTL counter (of which value is "24") of the header is less than the corresponding HTL counter (of which value is "27") of the FID table T1 ("NO" at Operation S107), the node device N2 determines that the received data frame is the loop data.

Accordingly, the node device N2 updates the corresponding HTL counter value ("27") of the FID table T1 with the HTL counter value ("24") (Operation S108). Referring to FIG. 6, since the node device N7 has the next highest priority after the node device N5 among the LD candidates for the GD3, the node device N2 selects the node device N7 as the LD (Operation S207), decrements the value of HTL counter of the header (Operation S209), and at the same time, sets the LS and the LD of the header as N2 and N7, respectively (Operation S210).

Also, as illustrated in FIG. 10 and FIG. 11, at timing (8), the node device N2 transmits the encrypted data frame to the node device N7. At timing (8), GS, FID, LD, HTL counter of the data frame becomes N1, FID1, N7 and "23", respectively, as illustrated in FIG. 12.

Here, referring to FIG. 10 and FIG. 11, it is assumed that the node device NX which is not related to the network 100 fraudulently receives the data frame transmitted by the node device N4 to the node device N2 at timing (4) and makes a retransmission attack on the node device N2 by transmitting the fraudulently received data frame (value of HTL counter=27) to the node device N2 at timing (9).

In this case, referring to FIG. 8 and FIG. 9, since the combination of GS (N1) and FID (FID1) of the header has already been registered in the FID table T1 of the node device N2 ("YES" at Operation S106), the node device N2, after being undergone the retransmission attack of the data frame (value of HTL counter=27), compares the HTL counter (of which value is 27) of the header with the corresponding HTL counter (of which value is 24) of the FID table T1.

Also, as a comparison result, since the HTL counter (of which value is 27) of the header is greater than or equal to the corresponding HTL counter (of which value is 24) of the FID table T1 ("YES" at Operation S107), the node device N2 determines that the received data frame is the redundant data and discards the received data frame (Operation S102).

As described above, the node device N2 detects the redundant data to be discriminated from the loop data so as to be able to manage the path directing toward GD3 via the adjacent node device N7 as a normal path. Further, the redundant data may be discarded to be able to suppress the increase of the traffic in the entire network.

Figure 13:
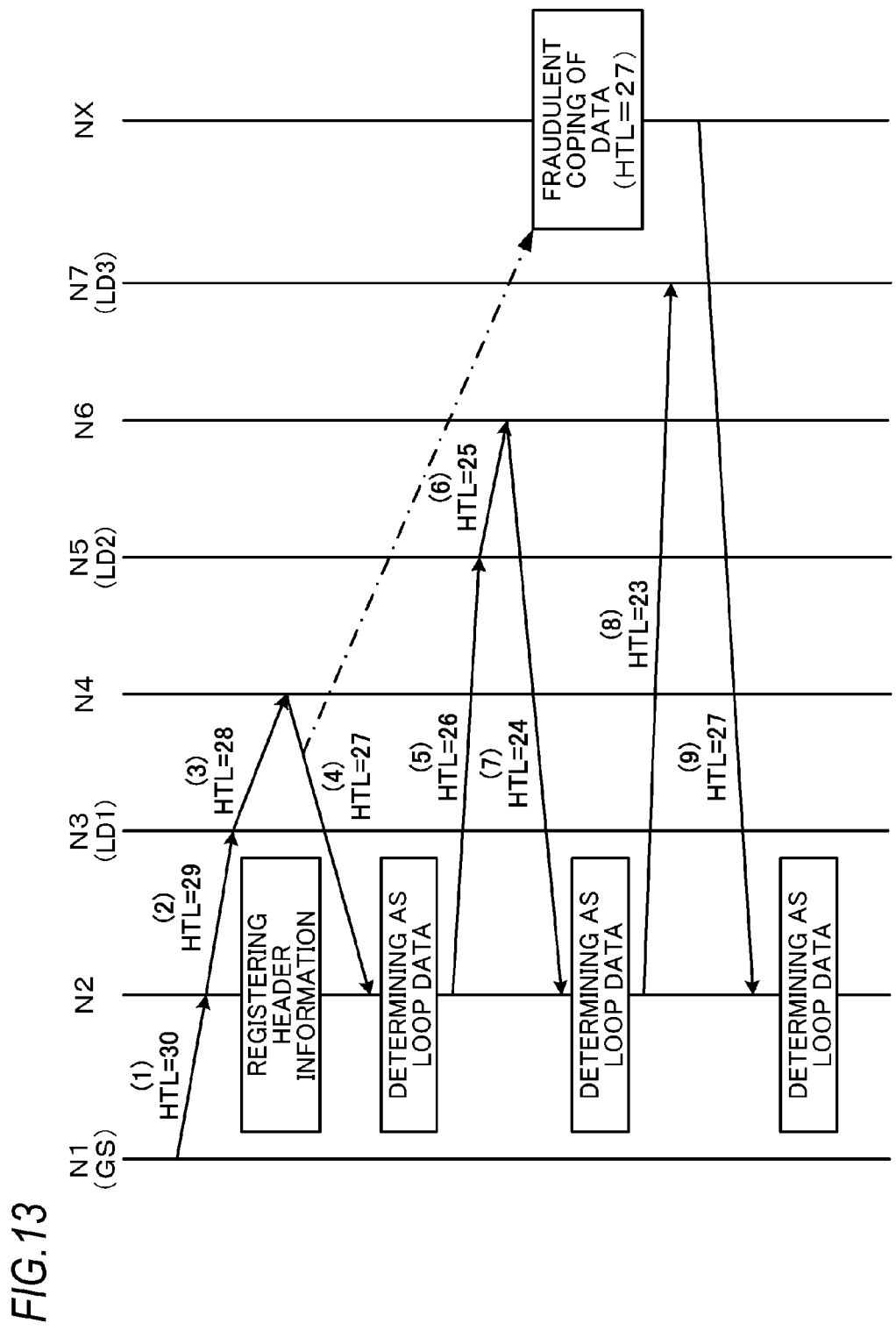
FIG. 13 is a conventional timing chart corresponding to the example illustrated in FIG. 10.

Subsequently, with reference to FIG. 10 and FIG. 13, descriptions will be made on a flow of a conventional transmission process in which the HTL counter is not managed using the FID table T1. FIG. 13 is a conventional timing chart corresponding to the example illustrated in FIG. 10. It is assumed that descriptions will be made only regarding timing (1) and timing (9).

Referring to FIG. 10 and FIG. 13, at timing (1), the node device N1 is a GS, and generates a data frame for which a GD is set as GD3 and a FID is set as FID1 and transmits the generated data frame to the node device N2 after encrypting the data frame.

Since the data frame received by the node device N2 is a data frame which is received for the first time, the node device N2 associates GS (N1) with FID (FID1) to be registered in the FID table T1.

Here, referring to FIG. 10 and FIG. 13, it is assumed that the node device NX which is not related to the network 100 fraudulently receives the data frame transmitted by the node device N4 to the node device N2 at timing (4) and makes a retransmission attack on the node device N2 by transmitting the fraudulently received data frame to the node device N2 at timing (9).

In the conventional method, since the combination of GS (N1) and FID (FID1) of the header has already been registered in the FID table T1 of the node device N2, the node device N2 having been undergone the retransmission attack of the data frame determines that the received data frame is loop data. Therefore, the node device N2 erroneously changes the normal path via the adjacent node device N7. The erroneous path change causes disconnection of the network or isolation of the node device 1 to make the maintenance of appropriate path to be difficult.

According to the First Embodiment, when the data frame is received, the node device 1 determines whether the combination of a GS and a FID that is coincident with a combination of the GS and the FID of the header is registered in the FID table T1. When it is determined that the combination of the GS and the FID that is coincident with those of the header is registered in the FID table T1, the node device 1 further compares the HTL counter of the header with the corresponding HTL counter of the FID table T1 to determine whether the received data frame is loop data or redundant data.

By configuring as described above, it becomes possible to discern between the loop data and the redundant data caused by the retransmission attack. Accordingly, it becomes possible to prevent an erroneous path change due to an erroneous determination that the redundant data is loop data. Accordingly, it becomes possible to prevent disconnection of the network or isolation of the node device due to an erroneous path change from occurring, so that an appropriate path may be maintained.

Further, according to the First Embodiment, when the received data frame is redundant data, the node device 1 discards the received data frame without transmitting the received data frame to other node device 1. By configuring as described above, it becomes possible to suppress an increase of the traffic in the entire network.

Further, according to the First Embodiment, the data frame is transmitted by being encrypted. Accordingly, even when the data frame is fraudulently received, forfeiting of the HTL counter value may be prevented.

Second Embodiment

In the First Embodiment, a case where a value of the HTL counter is decremented each time when the value is transmitted is exemplified. In the Second Embodiment, a case will be described in which the value of the HTL counter is incremented each time when the value is transmitted.

The configuration of the node device 1 in the Second Embodiment is basically the same as that of the First Embodiment. However, the role of a portion (data frame processing unit 34) of functional units common to the control units 30 of the Second Embodiment is different from that of the First Embodiment. Further, in the Second Embodiment, it is assumed that the transmission process is not executed when the HTL counter exceeds a predetermined value, for example, "30".

The data frame processing unit 34 processes the received data frame. More specifically, first, when the data frame is input from the frame type specifying unit 32, the data frame processing unit 34 interprets the header of the input data frame to determine whether the LD is coincident with its own node ID. Also, when it is determined that the LD is not coincident with its own node ID, the data frame processing unit 34 discards the received data frame.

When it is determined that the LD is coincident with its own node ID, the data frame processing unit 34 further determines whether the GD is coincident with its own node ID. That is, the data frame processing unit 34 determines whether the final destination of the received data frame is its own node device 1.

When it is determined that the final destination of the received data frame is its own node device 1, the data frame processing unit 34 outputs the received data frame to an upper layer. Then, the upper layer processes the received data frame in response to an input of the data frame.

When it is determined that the final destination of the received data frame is other node device 1, the data frame processing unit 34 compares the header with the FID table T1 to determine whether a combination of a GS and a FID that is coincident with a combination of the GS and the FID of the header is registered in the FID table T1. That is, the data frame processing unit 34 determines whether the same data frame has already been received.

When the combination of a GS and a FID that is coincident with the combination of the GS and the FID of the header is registered in the FID table T1 and the value of the HTL counter value of the header is less than or equal to the value of the HTL counter which is contained as an entry in the FID table T1, the data frame processing unit 34 determines that the received data frame is the redundant data. That is, the data frame processing unit 34 determines whether the number of transmission times of the received data frame is less than or equal to the number of transmission times indicated by the HTL counter which is contained as an entry. When it is determined that the number of transmission times of the received data frame is less than or equal to the number of transmission times indicated by the HTL counter which is contained as an entry, the data frame processing unit 34 determines that the received data frame is the redundant data.

When it is determined that the value of the HTL counter is greater than the value of the HTL counter which is contained as an entry, the data frame processing unit 34 determines that the received data frame is the loop data. That is, when the number of transmission times of the received data frame is greater than the number of transmission times indicated by the HTL counter which is contained as an entry, the data frame processing unit 34 determines that the received data frame is the loop data.

Also, when it is determined that the received data frame is the redundant data, the data frame processing unit 34 discards the received data frame and when it is determined that the received data frame is the loop data, the data frame processing unit 34 updates the corresponding HTL counter of the FID table T1 with the HTL counter of the header and instructs the root selection unit 35 to reselect the LD. In this case, the data frame processing unit 34 notifies the link management unit 33 that the data frame is to be looped back and an LD to which the loop data is transmitted. By doing this, the link management unit 33 may appropriately change the priority of the routing table T2.

When it is determined that the combination of a GS and a FID that is coincident with the combination of the GS and the FID of the header is not registered in the FID table T1, that is, when the data frame is a data frame which is received for the first time, the data frame processing unit 34 processes registration of the data frame in the FID table T1. More specifically, the data frame processing unit 34 associates the GS, FID and HTL counter value of the header with one another to be registered in the FID table T1.

The data frame processing unit 34 instructs the root selection unit 35 to select the LD in order to transmit the received data frame.

Further, when the selected LD is notified from the root selection unit 35, the data frame processing unit 34 performs the transmission process of the data frame. More specifically, when the selected LD is notified from the root selection unit 35, the data frame processing unit 34 increments the value of the HTL counter of the header to set its own node ID in the LS of the header and sets the LD selected from the root selection unit 35 in the LD of the header.

Also, the data frame processing unit 34 encrypts the data frame (for example, encryption using a fixed key, or common key between LD and LS) according to a predetermined encryption algorithm and then transmits the encrypted data frame to the adjacent node device 1 which is the set LD through the communication unit 10.

Further, the data frame processing unit 34 generates the data frame of the header illustrated in FIG. 3 in response to a request from the upper layer. In this case, the data frame processing unit 34 sets the HTL counter to an initial value (the initial value is set to, for example, "1" in the Second Embodiment). Further, the data frame processing unit 34 encrypts the generated data frame according to a predetermined encryption algorithm and transmits the encrypted data frame according to other node device 1 through the communication unit 10.

Figure 14:
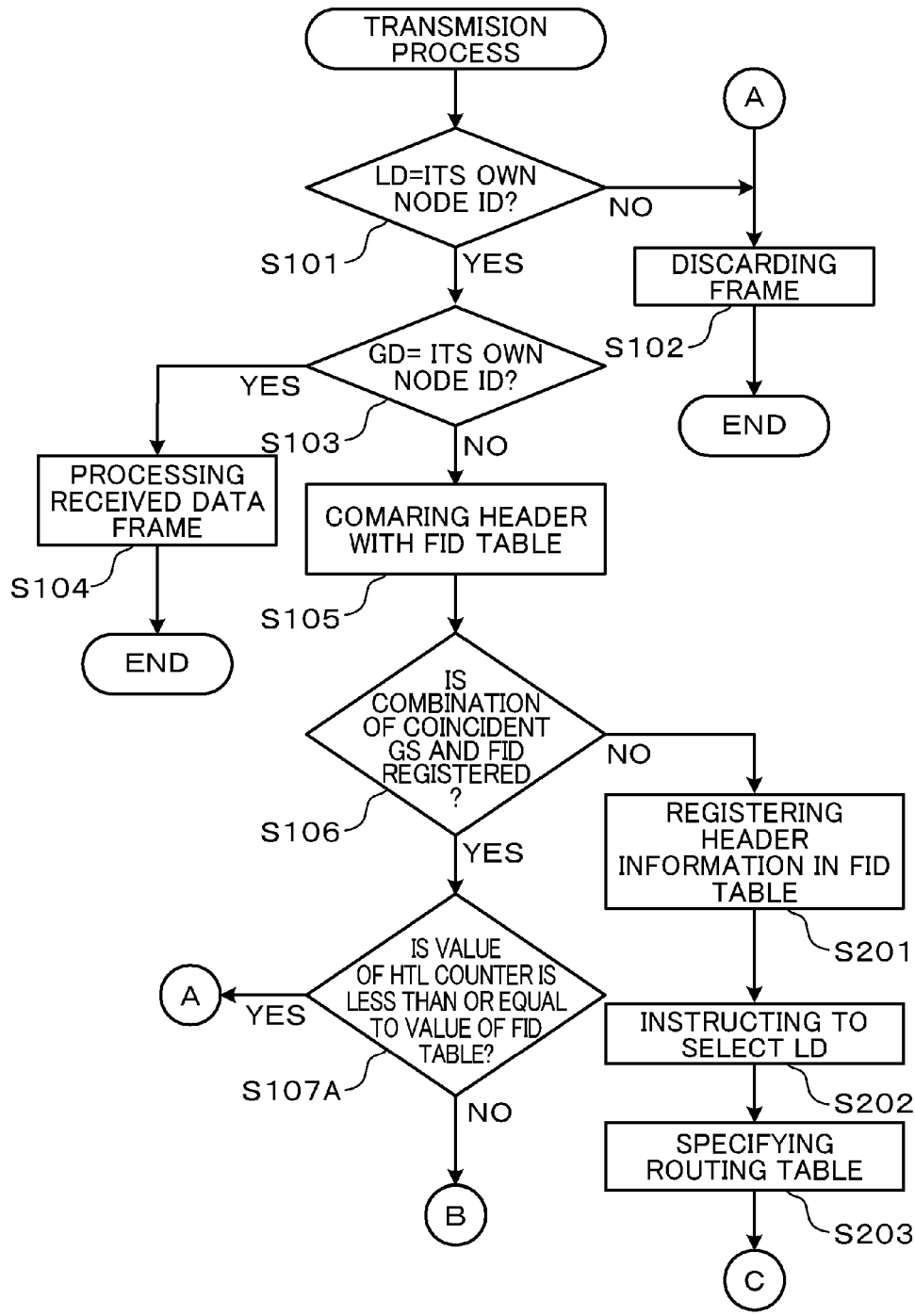
FIG. 14 is a view illustrating a portion of an example of a flowchart for explaining the flow of a transmission process according to the Second Embodiment.
Figure 15:
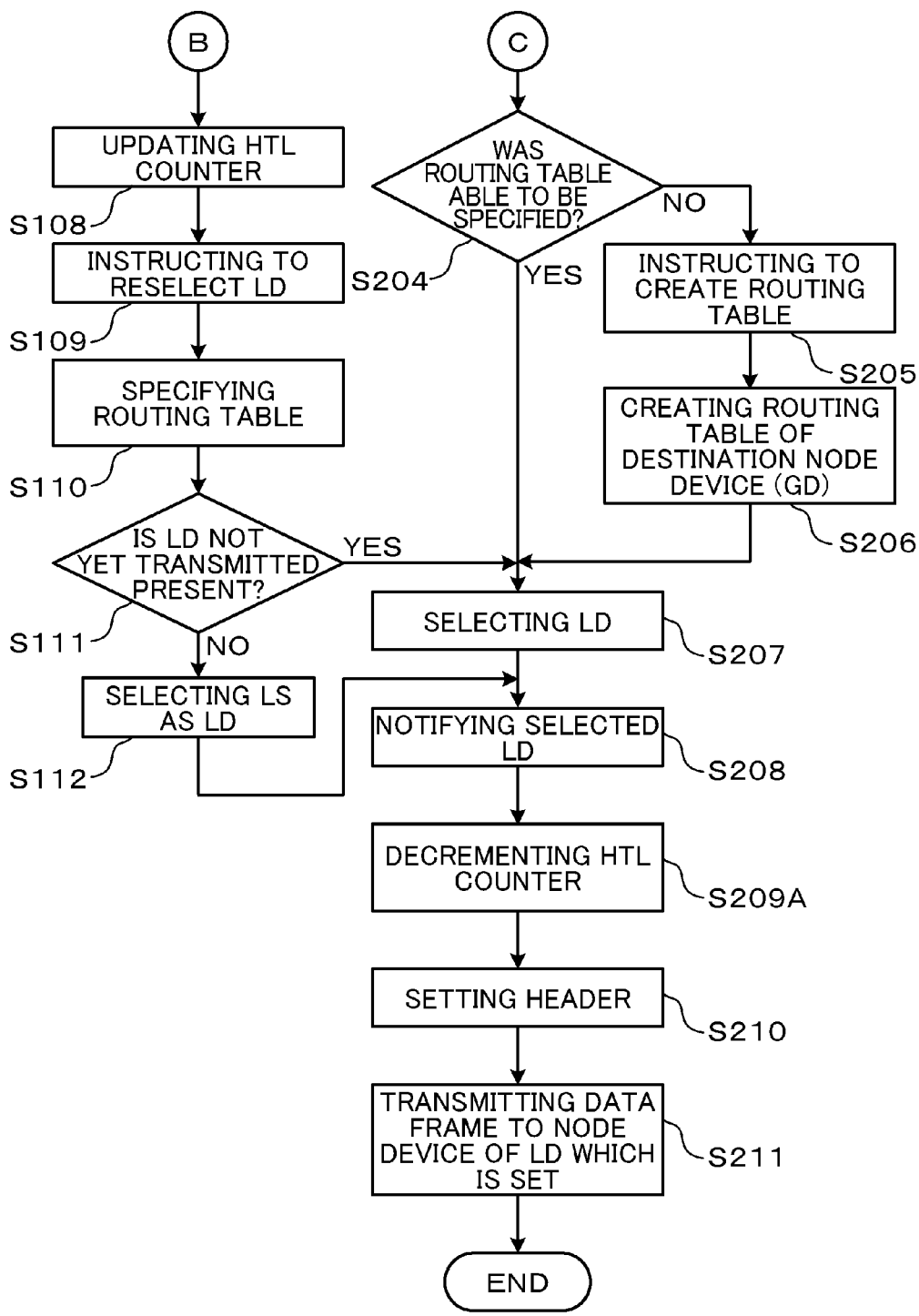
FIG. 15 is a view illustrating another portion of the example of the flowchart for explaining the flow of the transmission process according to the Second Embodiment.

Subsequently, descriptions will be made on the flow of the transmission process according to the Second Embodiment with reference to FIG. 14 and FIG. 15. FIG. 14 and FIG. 15 are views illustrating a portion and another portion of an example of a flowchart for explaining the flow of a transmission process according to the Second Embodiment, respectively. The transmission process is a process corresponding to the processing of Operation S006 of the frame type specifying the process described in the First Embodiment.

The frame type specifying process in Embodiment 2 is the same as that in the First Embodiment. Further, same reference numerals are assigned to the Operations of the processings which are the same as those of the First Embodiment. Here, descriptions will be made mainly on the processings different from those of the First Embodiment.

The data frame processing unit 34 compares the header with FID table T1 (Operation S105) to determine whether the combination of the GS and the FID that is coincident with the combination of the GS and the FID of the header is registered in the FID table (Operation S106). That is, the data frame processing unit 34 determines whether the same data frame has already been received.

When it is determined that the combination of the GS and the FID that is coincident with the combination of the GS and the FID of the header is registered in the FID table ("YES" at Operation S106), the data frame processing unit 34 further determines whether the HTL counter value of the header is less than or equal to the value of the HTL counter which is contained as an entry for which the combination of the GS and the FID is coincident with the combination of the GS and the FID (Operation S107A)

When it is determined that the value of the HTL counter of the header is less than or equal to the value of the HTL counter which is contained as an entry ("YES" at Operation S107A), that is, when it is determined that the received data frame is the redundant data, the data frame processing unit 34 discards the received data frame (Operation S102). Then, the transmission process ends.

When it is determined that the value of the HTL counter of the header is greater than the value of the HTL counter which is contained as an entry ("NO" at Operation S107A), that is, when it is determined that the received data frame is loop data, the data frame processing unit 34 updates the corresponding HTL counter of the FID table T1 with the HTL counter of the header (Operation S108), and instructs the root selection unit 35 to reselect the LD (Operation S109). Then, the process proceeds to the processing of Operation S110 described in the First Embodiment.

In the processing of Operation S106, when it is determined that the combination of the GS and the FID that is coincident with a combination of the GS and the FID of the header is not registered in the FID table T1 ("NO" at Operation S106), that is, when it is determined that the frame is a data frame which is received for the first time, the data frame processing unit 34 associates the GS, FID and HTL counter value of the header with one another to be registered in the FID table T1 (Operation S201). Also, the process proceeds to the processing of Operation S202 described in the First Embodiment.

Here, in the processing of Operation S208, the root selection unit 35 notifies the selected LD to the data frame processing unit 34 (Operation S208). The data frame processing unit 34 which has received the notification of the selected LD increments the value of the HTL counter of the header (Operation S209A), and at the same time, sets the header (Operation S210).

Also, the decryption processing unit 31 encrypts the data frame according to a predetermined encryption algorithm and then transmits the encrypted data frame to the adjacent node device 1 which is the set LD, that is, the LD selected by the root selection unit 35 through the communication unit 10 (Operation S211). Then, the process ends.

Third Embodiment

In the First Embodiment and the Second Embodiment, the node device 1 is configured in such a manner that when the final destination of the received data frame is its own node device 1, that is, when the GD is coincident with its own node ID, the processing of registration into the FID table T1 is not performed. In the Third Embodiment, even when the GD is coincident with its own node ID, the node device 1 performs the processing of registration into the FID table T1. The configuration may be applied to any of the First Embodiment and the Second Embodiment.

Figure 16:
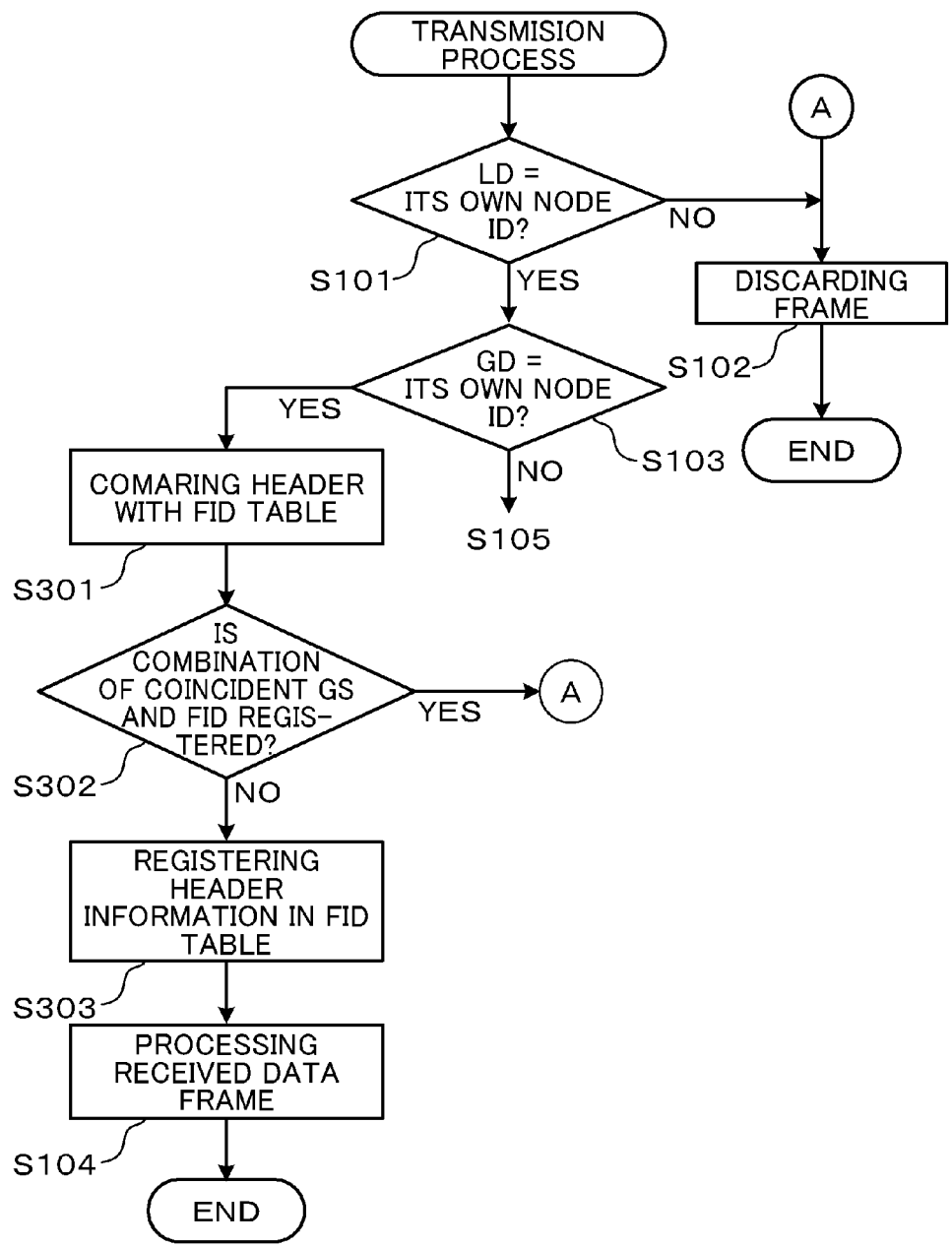
FIG. 16 is a view illustrating a portion of an example of a flowchart for explaining the flow of the transmission process according to the Third Embodiment.

Here, descriptions will be made on the flow of the transmission process according to the Third Embodiment with reference to FIG. 16. FIG. 16 is a view illustrating a portion of an example of a flowchart for explaining the flow of the transmission process according to the Third Embodiment. The transmission process is a process corresponding to the processing of Operation S006 of the frame type specifying process described in the First Embodiment.

The data frame processing unit 34 interprets the header of the received data frame to determine whether the LD is coincident with its own node ID (Operation S101). When it is determined that the LD is not coincident with its own node ID ("NO" at Operation S101), the data frame processing unit 34 discards the received data frame (Operation S102). Then, the transmission process ends.

When it is determined that the LD is coincident with its own node ID ("YES" at Operation S101), the data frame processing unit 34 further determines whether the GD is coincident with its own node ID (Operation S103). That is, the data frame processing unit 34 determines whether the final destination of the received data frame is its own node device 1.

When it is determined by the data frame processing unit 34 that the GD is not coincident with its own node ID ("NO" at Operation S103), the process proceeds to the processings after Operation S105 described in the First Embodiment (or the Second Embodiment).

When it is determined that the GD is coincident with its own node ID ("YES" at Operation S103), the data frame processing unit 34 compares the header and the FID table T1 (Operation S301) to determine whether the combination of the GS and the FID that is coincident with the combination of the GS and the FID of the header is registered in the FID table T1 (Operation S302). That is, the data frame processing unit 34 determines whether the same data frame has already been received and processed in the upper layer.

When it is determined that the combination of the GS and the FID that is coincident with the combination of the GS and the FID of the header is registered in the FID table T1 ("YES" at Operation S302), that is, when it is determined that the processing for the received data frame has been completed in the upper layer, the data frame processing unit 34 discards the received data frame (Operation S102).

When it is determined that the combination of the GS and the FID that is coincident with a combination of the GS and the FID of the header is not registered in the FID table T1 ("NO" at Operation S302), the data frame processing unit 34 associates at least GS with FID of the header to be registered in the FID table T1 (Operation S303).

Also, the data frame processing unit 34 outputs the received data frame to the upper layer and the upper layer processes the received data frame in response to the input of the data frame (Operation S104), and the transmission process ends.

According to the Third Embodiment, the node device 1 compares the header with the FID table T1 to determine whether the combination of the GS and the FID that is coincident with a combination of the GS and the FID of the header is registered in the FID table T1 even when the data frame in which the GD is coincident with its own node ID is received. Also, when the combination of the GS and the FID coincident with that of the header is registered in the FID table, the node device 1 discards the received data frame. When the combination coincident with that of the header is not registered in the FID table, the node device 1 registers the header information in the FID table T1 and a data processing is performed in the upper layer. By configuring as described above, it becomes possible to prevent that the same processing from being repeatedly executed and thus, load may be reduced.

Figure 17:
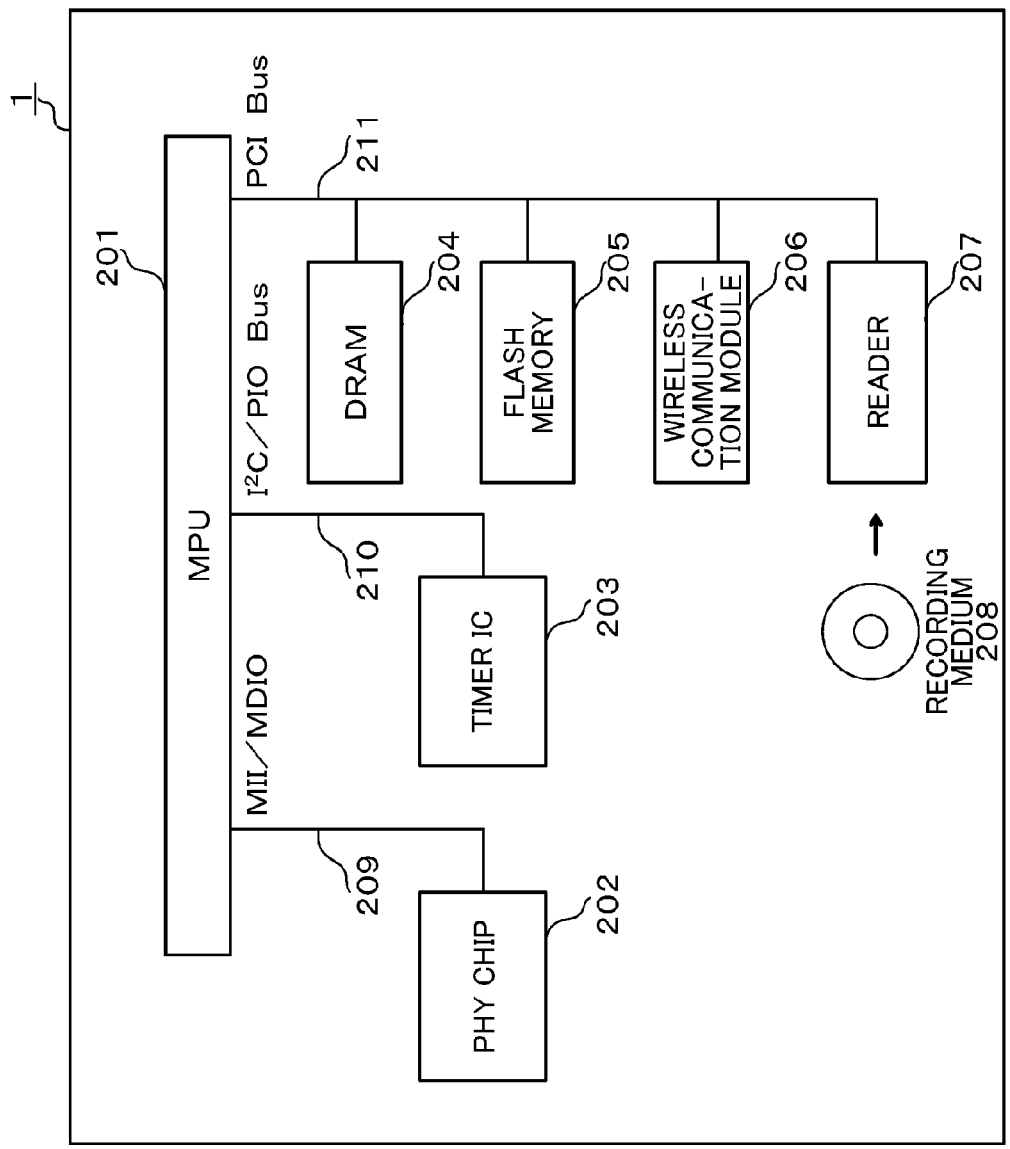
FIG. 17 is a view illustrating an example of a hardware configuration of the node device according to the embodiments.

FIG. 17 is a view illustrating an example of a hardware configuration of the node device 1 according to the respective embodiments. The node device 1 illustrated in FIG. 2 may be implemented by, for example, various hardware illustrated in FIG. 17. In the example of FIG. 17, the node device 1 includes a MPU 201, a PHY (PHYsical layer) chip 202 and a timer IC (Integrated Circuit) 203. Further, the node device 1 includes a DRAM (Dynamic Random Access Memory) 204, a flash memory 205, a wireless communication module 206 and a reader 207.

A communication interface connecting the MPU 201 and the PHY chip 202 is MII/MDIO (Media Independent Interface or Management Data Input/Output) 209. Both the MII and MDIO are interfaces between the physical layer and MAC (Media Access Control) sub-layer. Further, the MPU 201 and the timer IC 203 are connected with each other through an I2C/PIO (Inter-Integrated Circuit or Parallel Input/Output) bus 210. Also, the DRAM 204, the flash memory 205, the wireless communication module 206 and the reader 207 are connected to the MPU 201 through a PCI (Peripheral Component Interconnect) bus 211.

The MPU 201 loads an operation program stored in the flash memory 205, which is a kind of a non-volatile storage device, into the DRAM 204 and executes various processes while using the DRAM 204 as a working memory. The MPU 201 may execute the operation program so as to implement respective functional units of the control unit 30 illustrated in FIG. 2.

The operation program for executing the operations described above may be stored in a computer-readable recording medium 208 such as, for example, a flexible disk, CD-ROM (Compact Disk-Read Only Memory), DVD (Digital Versatile Disk) or MO (Magnet Optical disk) to be distributed and read by the reader 207 of the node device 1 to be installed in a computer, causing the processing described above to be executed. Further, the operation program may be stored in a disk device provided in a server apparatus on the Internet and downloaded into the computer of the node device 1 through the PHY chip 202 or the wireless communication module 206.

Different types of storage devices other than DRAM 204 or the flash memory 205 may be used depending on the embodiment. For example, the node device 1 may include a storage device such as a CAM (Content Addressable Memory), SRAM (Static Random Access Memory), or SDRAM (Synchronous Dynamic Random Access Memory).

The FID table T1 and the routing table T2 illustrated in, for example, FIG. 2, are implemented by the DRAM 204, flash memory 205 or other storage device which is not illustrated. Further, for example, the flash memory 205 also stores not only the operation program but also its own node ID.

The PHY chip 202 is a circuit that handles the processing for the physical layer in the wired connection. When the network 100 is a wireless network, the node device 1 may not include the PHY chip 202. However, the node device 1 may include the PHY chip 202 for connecting the node device 1 with external network.

For example, the node device 1 includes a wired LAN port according to the Ethernet (registered trademark) standard and may be connected to a gateway device of an external network through a cable connected to the wired LAN port.

In such a case, the MPU 201 may generate an Ethernet frame to output the Ethernet frame to PHY chip 202 through the MII/MDIO 209. Also, the PHY chip 202 converts the output (that is, a logic signal indicating the Ethernet frame) from the MPU 201 into signal (that is, electric signal or optical signal) according to the type of cable to output the converted signal to the cable. By doing this, the node device 1 may transmit data (for example, frame) to the external network using the PHY chip 202.

Further, the PHY chip 202 may convert the electric signal or optical signal, which is input from the external network through the cable and wired LAN port, into the logic signal to output the converted signal to the MPU 201 through the MII/MDIO 209. By doing this, the node device 1 may receive data (e.g., a frame) from the external network using the PHY chip 202.

The timer IC 203 is a circuit which performs a counting-up operation until the set time elapses and outputs an interrupt signal when the set time has elapsed.

The wireless communication module 206 is a hardware which handles the processing for the physical layer in wireless connection. The wireless communication module 206 includes, for example, an antenna, ADC (Analog-to-Digital Converter), DAC (Digital-to-Analog Converter), a modulator, a demodulator, an encoder and a decoder.

In the meantime, the hardware configuration of the node device 1 may be different from that illustrated in FIG. 17 and other hardware except for the hardware of which specification and type are exemplified in FIG. 17 may be applied to the node device 1, depending on the embodiment.

For example, each functional unit of the control unit 30 illustrated in FIG. 2 may be implemented by a hardware circuit. Specifically, each functional unit of the control unit 30 illustrated in FIG. 2 may be implemented by a reconfigurable circuit such as, for example, FPGA (Field Programmable Gate Array), or ASIC (Application Specific Integrated Circuit), instead of the MPU 201. Further, these functional units may be implemented by both the MPU 201 and the hardware circuit.

Several exemplary embodiments have been described in the above. However, it is to be understood that various modifications and alternatives to the disclosed embodiments may be made. For example, the above embodiments are not intended to have a limited sense but may be modified and practiced in various ways without departing from the spirit and scope of the invention. Further, it is to be understood by those skilled in the art that different embodiments may be practiced by deleting some elements from the above embodiments, substituting some elements with other elements or adding some elements to the above embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node device comprising:
a communication unit configured to transmit a data frame containing frequency information which indicates a number of times that the data frame is transmitted, and receive the data frame transmitted from any one of a plurality of adjacent node devices;
a storage unit configured to store a table in which frame identification information for identifying the data frame and the frequency information of the data frame are associated with each other; and
a control unit configured to:
determine whether a destination of the received data frame is its own node device;
determine, when it is determined that the destination of the received data frame is not its own node device, whether the frame identification information of the received data frame is registered in the table;
determine, when it is determined that the frame identification information of the received data frame is registered in the table, whether the number of transmission times indicated by the frequency information of the received data frame is less than or equal to the number of transmission times indicated by the frequency information corresponding to the frame identification information registered in the table;
update, when it is determined that the number of transmission times indicated by the frequency information of the received data frame is greater than the number of transmission times indicated by the frequency information corresponding to the frame identification information registered in the table, the frequency information corresponding to the frame identification information registered in the table with the frequency information of the received data frame; and
increase, when it is determined that the number of transmission times indicated by the frequency information of the received data frame is greater than the number of transmission times indicated by the frequency information corresponding to the frame identification information registered in the table, the number of transmission times indicated by the frequency information of the received data frame,
wherein the communication unit transmits the data frame for which the number of transmission times is increased to an adjacent node device which is not selected as a transmission destination of the data frame.

2. The node device according to claim 1,
wherein the control unit is configured to discard the received data frame, when it is determined that the number of transmission times indicated by the frequency information of the received data frame is less than or equal to the number of transmission times indicated by the frequency information corresponding to the frame identification information registered in the table.

3. The node device according to claim 1,
wherein the control unit is configured to associate the frame identification information of the received data frame and the frequency information with each other so as to be registered in the table, when it is determined that the frame identification information of the received data frame is not registered in the table.

4. The node device according to claim 1,
wherein the control unit is configured to:
determine, when it is determined that the destination of the received data frame is its own node device, whether the frame identification information of the received data frame is registered in the table; and
register at least the frame identification information of the received data frame in the table and transfer the received data frame to an upper layer to be processed in the upper layer, when it is determined that the frame identification information of the received data frame is not registered in the table.

5. The node device according to claim 4,
wherein the control unit is configured to discard the received data frame when it is determined that the frame identification information of the received data frame is registered in the table.

6. The node device according to claim 1,
wherein the frequency information is a counter value of a counter for limiting the number of transmission times of the data frame.

7. The node device according to claim 6,
wherein the counter is increased or decremented each time when the data frame is transmitted, and
wherein the control unit is configured to increase or decrease the counter value in order to increase the number of transmission times of the received data frame indicated by the frequency information.

8. The node device according to claim 1,
wherein the control unit is configured to generate the data frame for which the number of transmission times is set to once, and
wherein the communication unit transmits the generated data frame.

9. The node device according to claim 1,
wherein the data frame received by the communication unit is encrypted, and
wherein the communication unit is configured to decrypt the encrypted data frame, encrypts the data frame, and transmits the encrypted data frame.

10. The node device according to claim 9,
wherein the control unit is configured to generate the data frame for which the number of transmission times is set to once, and
wherein the communication unit is configured to encrypt the generated data frame, and transmit the encrypted data frame.

11. A data relaying method comprising:
receiving a data frame containing frequency information which indicates a number of times that the data frame is transmitted from any one of a plurality of adjacent node devices;
determining whether a destination of the received data frame is its own node device;
determining, when it is determined that the destination of the received data frame is not its own node device, whether the frame identification information of the received data frame is registered in a table in which frame identification information for identifying the data frame and the frequency information of the data frame are associated with each other;
determining, when it is determined that the frame identification information of the received data frame is registered in the table, whether the number of transmission times indicated by the frequency information of the received data frame is less than or equal to the number of transmission times indicated by the frequency information corresponding to the frame identification information registered in the table;
updating, when it is determined that the number of transmission times indicated by the frequency information of the received data frame is greater than the number of transmission times indicated by the frequency information corresponding to the frame identification information registered in the table, the frequency information corresponding to the frame identification information registered in the table with the frequency information of the received data frame;
increasing, when it is determined that the number of transmission times indicated by the frequency information of the received data frame is greater than the number of transmission times indicated by the frequency information corresponding to the frame identification information registered in the table, the number of transmission times indicated by the frequency information of the received data frame; and
transmitting the data frame for which the number of transmission times is increased to an adjacent node device which is not selected as a transmission destination of the data frame.

12. A computer-readable recording medium storing a program that causes a computer of a node device configured to transmit a data frame containing frequency information which indicates a number of times that the data frame is transmitted to execute a procedure, the procedure comprising:
receiving a data frame containing frequency information which indicates a number of times that the data frame is transmitted from any one of a plurality of adjacent node devices;
determining whether a destination of the received data frame is its own node device;
determining, when it is determined that the destination of the received data frame is not its own node device, whether the frame identification information of the received data frame is registered in a table in which frame identification information for identifying the data frame and the frequency information of the data frame are associated with each other;
determining, when it is determined that the frame identification information of the received data frame is registered in the table, whether the number of transmission times indicated by the frequency information of the received data frame is less than or equal to the number of transmission times indicated by the frequency information corresponding to the frame identification information registered in the table;
updating, when it is determined that the number of transmission times indicated by the frequency information of the received data frame is greater than the number of transmission times indicated by the frequency information corresponding to the frame identification information registered in the table, the frequency information corresponding to the frame identification information registered in the table with the frequency information of the received data frame;
increasing, when it is determined that the number of transmission times indicated by the frequency information of the received data frame is greater than the number of transmission times indicated by the frequency information corresponding to the frame identification information registered in the table, the number of transmission times indicated by the frequency information of the received data frame; and
transmitting the data frame for which the number of transmission times is increased to an adjacent node device which is not selected as a transmission destination of the data frame.

* * * * *